United States Patent
Shan et al.

(10) Patent No.: US 9,769,605 B2
(45) Date of Patent: Sep. 19, 2017

(54) SYSTEMS, DEVICES, AND METHODS FOR SHARING GEOGRAPHIC LOCATION

(71) Applicant: Tencent Technology (Shenzhen) Company Limited, Shenzhen, Guangdong (CN)

(72) Inventors: Yi Shan, Guangdong (CN); Pinlin Chen, Guangdong (CN); Dacheng Zhuo, Guangdong (CN); Liang Wu, Guangdong (CN); Ling Li, Guangdong (CN); Jun Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/608,712

(22) Filed: Jan. 29, 2015

(65) Prior Publication Data
US 2015/0141060 A1 May 21, 2015

Related U.S. Application Data

(63) Continuation of application No. PCT/CN2014/078486, filed on May 27, 2014.

(30) Foreign Application Priority Data

Sep. 24, 2013 (CN) .......................... 2013 1 0449283

(51) Int. Cl.
H04W 24/00 (2009.01)
H04W 4/02 (2009.01)
(Continued)

(52) U.S. Cl.
CPC ........... *H04W 4/023* (2013.01); *G01S 5/0072* (2013.01); *H04L 51/32* (2013.01); *H04W 4/02* (2013.01);
(Continued)

(58) Field of Classification Search
CPC ..... H04L 67/18; H04L 167/22; H04L 65/403; H04L 67/10; H04L 51/32; H04L 67/24;
(Continued)

(56) References Cited

U.S. PATENT DOCUMENTS

| 8,284,748 B2 * | 10/2012 | Borghei | ................ H04W 4/021 370/252 |
| 8,761,797 B1 * | 6/2014 | Norton | .................. H04W 64/00 455/456.1 |

(Continued)

FOREIGN PATENT DOCUMENTS

| CN | 101788661 A | 7/2010 |
| CN | 102147810 A | 8/2011 |

(Continued)

OTHER PUBLICATIONS

International Search Report issued Sep. 2, 2014 in International Application No. PCT/CN2014/078486.
(Continued)

*Primary Examiner* — Olumide T Ajibade Akonai
(74) *Attorney, Agent, or Firm* — Brinks Gilson & Lione

(57) ABSTRACT

The present disclosure provides a terminal including a processor-readable storage medium including a set of instructions for geographic location sharing between the terminal and a target terminal; and a processor in communication with the storage medium. The processor is configured to execute the set of instructions to establish a communication with a target terminal of a target user remote to the terminal though a social networking application installed in the terminal; acquire a current geographic location information of the terminal at an interval of a preset period of time; and send the current geographic location information of the terminal to the target terminal at an interval of a preset period of time.

20 Claims, 10 Drawing Sheets

(51) Int. Cl.
*H04W 4/20* (2009.01)
*H04L 12/58* (2006.01)
*G01S 5/00* (2006.01)
*H04W 88/02* (2009.01)

(52) U.S. Cl.
CPC ............ *H04W 4/028* (2013.01); *H04W 4/206* (2013.01); *H04W 88/02* (2013.01)

(58) Field of Classification Search
CPC ..... H04L 67/12; H04L 67/306; H04L 12/588; H04L 51/04; H04L 51/046; H04L 51/20; H04L 51/38; H04L 12/5865; H04L 12/5895; H04L 67/22; H04W 4/02; H04W 4/023; H04W 4/021; H04W 4/206; H04W 64/00; H04W 4/08; H04M 3/42348; G06F 3/0485; G06F 3/0482; G06F 3/0488; G06F 2200/1637; G06F 3/0416; G06F 3/04842; G06F 3/04855; G01C 21/367; G01C 21/3664; G06C 50/01; G06C 30/0261; G06C 30/0269

See application file for complete search history.

(56) References Cited

U.S. PATENT DOCUMENTS

| | | | | |
|---|---|---|---|---|
| 9,116,004 | B2* | 8/2015 | Schaaf | ................. G01C 21/367 |
| 2006/0223518 | A1* | 10/2006 | Haney | ............... H04M 1/72519 455/420 |
| 2008/0052372 | A1* | 2/2008 | Weber | ............... G06F 17/30265 709/217 |
| 2008/0070593 | A1* | 3/2008 | Altman | ................. H04L 63/102 455/457 |
| 2008/0209011 | A1 | 8/2008 | Stremel et al. | |
| 2010/0005390 | A1* | 1/2010 | Bong | .................... G06F 3/0414 715/702 |
| 2010/0073201 | A1 | 3/2010 | Holcomb et al. | |
| 2011/0028132 | A1* | 2/2011 | Bos | ................... H04M 3/42348 455/414.2 |
| 2013/0137463 | A1 | 5/2013 | Busch | |
| 2014/0067255 | A1* | 3/2014 | Hsu | ........................ G01C 21/00 701/412 |
| 2014/0207375 | A1* | 7/2014 | Lerenc | .................... H04W 4/02 701/527 |
| 2014/0336931 | A1* | 11/2014 | Wilkins | ................. G01C 21/20 701/527 |
| 2015/0172393 | A1* | 6/2015 | Oplinger | ................. H04L 67/10 709/204 |

FOREIGN PATENT DOCUMENTS

| | | |
|---|---|---|
| CN | 102440011 A | 5/2012 |
| TW | 201146056 | 12/2011 |
| WO | 2006/024003 A1 | 3/2006 |

OTHER PUBLICATIONS

Office Action dated Jul. 4, 2017 for Chinese Application No. 201310449283.3, 11 pages.

* cited by examiner

SYSTEMS, DEVICES, AND METHODS FOR SHARING GEOGRAPHIC LOCATION

PRIORITY STATEMENT

This application is a continuation of PCT/CN2014/078486, filed on May 27, 2014, in the State Intellectual Property Office of the People's Republic of China, which claims the priority benefit of Chinese Patent Application No. 201310449283.3 filed on Sep. 24, 2013, the disclosures of which are incorporated herein in its entirety by reference.

TECHNICAL FIELD

The present disclosure relates to network technologies. Specifically, the present disclosure relates to systems, devices, and methods for sharing a geographic location.

BACKGROUND

With developments of internet communication technology and positioning technology, many network applications may be developed to provide a geographic location service. Through the positioning technology, these network applications allow users to share their geographic locations with others.

During geographic location sharing, geographic locations that a user shares with other users using a terminal may be traditionally static geographic locations, with a typical sharing process may be as follows: the terminal may acquire and/or obtain information such as a coordinate or a point of interest (POI) of a current geographic location of the user, and may send the information as current geographic location information of the user to terminals used by other users, so that other users can perform positioning to obtain the current geographic location of the user.

Because the shared geographic location is static, when the user moves other users cannot obtain an updated geographic location of the user in time. As a result, shared geographic location information may be not as valuable as a reference of wherein the user is, and other users cannot perform accurate positioning of the user according to the geographic location information received by terminals used by the other users.

SUMMARY

According to an aspect of the present disclosure, a terminal may include a processor-readable storage medium including a set of instructions for geographic location sharing between the terminal and a target terminal; and a processor in communication with the storage medium. The processor may be configured to execute the set of instructions to establish a communication with a target terminal of a target user remote to the terminal though a social networking application installed in the terminal; acquire a current geographic location information of the terminal at an interval of a preset period of time; and send the current geographic location information of the terminal to the target terminal at an interval of a preset period of time.

According to another aspect of the present disclosure, a method for sharing a geographic location may include providing a terminal as the first terminal for a first user, wherein the terminal including a processor-readable storage medium and a processor in communication with the storage medium to perform the method, and the first terminal is in communication with a second terminal of a second user remote to the first terminal though a social networking application installed in the first terminal. the method may further include acquiring, by the first terminal, a current geographic location information of the first terminal at an interval of a preset period of time; and sending, by the first terminal, the updated geographic location information of the first terminal to the second terminal at an interval of a preset period of time.

BRIEF DESCRIPTION OF THE DRAWINGS

The above and other features and advantages will become more apparent by describing in detail example embodiments thereof with reference to the attached drawings in which.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter may be intended to be construed as not being limited to any example embodiments set forth herein; example embodiments may be provided merely to be illustrative. Likewise, a reasonably broad scope for claimed or covered subject matter may be intended. Among other things, for example, subject matter may be embodied as methods, devices, components, or systems. The following detailed description is, therefore, not intended to be limiting on the scope of what may be claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It may be intended, for example, that claimed subject matter may include combinations of example embodiments in whole or in part.

Figure 1:
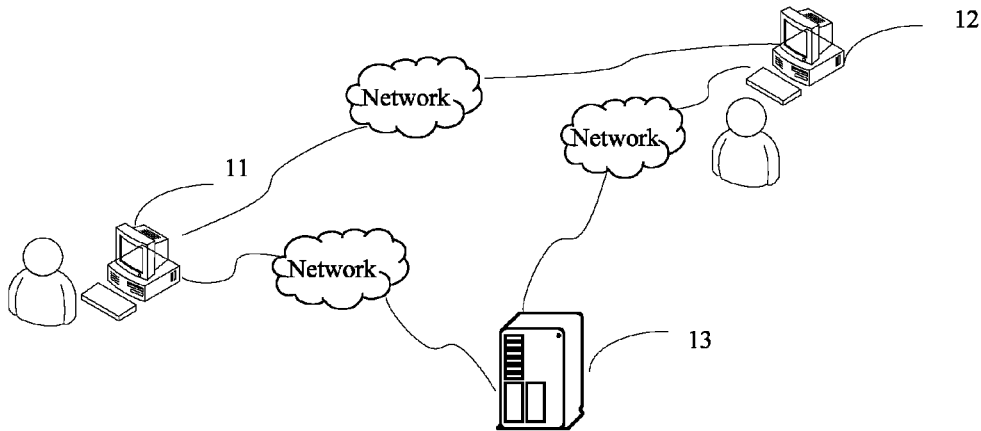
FIG. 1 is a schematic view of a an implementation environment according to example embodiments of the present disclosure.

In general, terminology may be understood at least in part from usage in context. For example, terms, such as "and", "or", or "and/or," as used herein may include a variety of meanings that may depend at least in part upon the context in which such terms may be used. Typically, "or" if used to associate a list, such as A, B or C, may be intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context FIG. 1 shows a schematic structural diagram of an implementation environment involved in a method for sharing a geographic location according to an embodiment of the present disclosure. The implementation environment may include a first terminal 11 and a second terminal 12. The implementation environment may also include a server 13.

The first terminal 11 may be a terminal used by a first user. The second terminal 12 may be a terminal used by a second user. The first terminal 11 and the second terminal 12 may be directly or indirectly connected through a network, and the network may be a wireless network or a wired network. The first terminal 11 may refresh and/or update information about its current geographic location in real-time, and may send the updated geographic location information to the second terminal 12, so that the first terminal 11 dynamically shares its geographic location with the second terminal 12 in real-time. In addition, the second terminal 12 may refresh and/or update information about its current geographic location in real-time, and may send the updated geographic location information to the first terminal 11, so that the second terminal 12 dynamically shares its geographic location with the first terminal 11 in real-time.

The first and second terminals 11, 12 may communicate with each other over the network directly. Alternatively, the first terminal 11 and the second terminal 12 may separately communicate with the server 13 through a network, wherein the network may be a wireless network or a wired network. The first terminal 11 and the second terminal 12 may perform information interaction through the server 13, thereby sharing their geographic locations in real-time.

Figure 16:
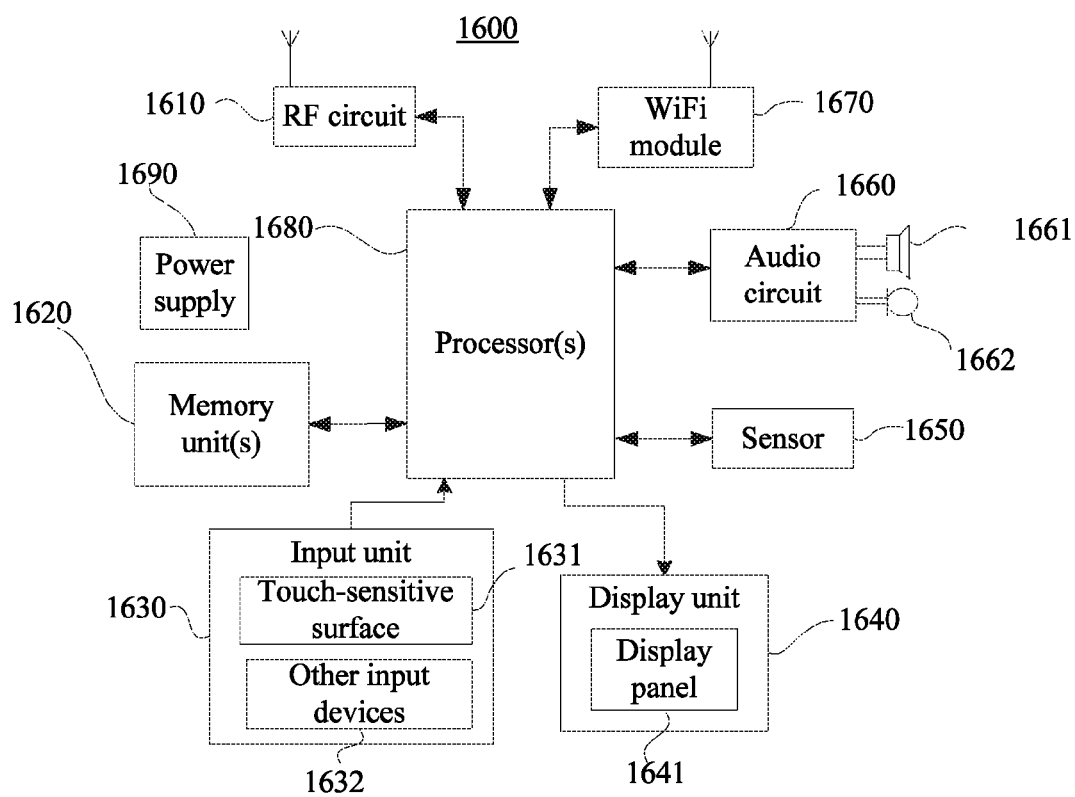
FIG. 16 illustrates a structural diagram of a terminal 1600 according to the example embodiments of the present disclosure.

FIG. 16 illustrates a structural diagram of a terminal 1600 according to the example embodiments of the present disclosure. The terminal 1600 may be used as the first and second terminals 11, 12 in FIG. 1. The terminal 1600 may be implemented as systems and/or to operate methods disclosed in the present disclosure.

The terminal 1600 may include an RF (Radio Frequency) circuit 1610, one or more than one memory unit(s) 1620 of computer-readable memory media, an input unit 1630, a display unit 1640, a sensor 1650, an audio circuit 1660, a WiFi (wireless fidelity) module 1670, at least one processor 1680, and a power supply 1690. Those of ordinary skill in the art may understand that the structure of the terminal 1600 shown in FIG. 16 does not constitute restrictions on the terminal 1600. Compared with what may be shown in the figure, more or fewer components may be included, or certain components may be combined, or components may be arranged differently.

The RF circuit 1610 may be configured to receive and transmit signals during the course of receiving and transmitting information and/or phone conversation. Specifically, after the RF circuit 1610 may receive downlink information from a base station, it may hand off the downlink information to the processor 1680 for processing. Additionally, the RF circuit 1610 may transmit uplink data to the base station. Generally, the RF circuit 1610 may include, but is not limited to, an antenna, at least one amplifier, a tuner, one or multiple oscillators, a subscriber identification module (SIM) card, a transceiver, a coupler, an LNA (Low Noise Amplifier), and a duplexer. The RF circuit 1610 may also communicate with a network and/or other devices via wireless communication. The wireless communication may use any communication standards or protocols available or one of ordinary skill in the art may perceive at the time of the present disclosure. For example, the wireless communication may include, but not limited to, GSM (Global System of Mobile communication), GPRS (General Packet Radio Service), CDMA (Code Division Multiple Access), WCDMA (Wideband Code Division Multiple Access), LTE (Long Term Evolution), email, and SMS (Short Messaging Service).

The memory unit 1620 may be configured to store software programs and/or modules. The software programs and/or modules may be sets of instructions to be executed by the processor 1680. The processor 1680 may execute various functional applications and data processing by running the software programs and modules stored in the memory unit 1620. The memory unit 1620 may include a program memory area and a data memory area, wherein the program memory area may store the operating system and at least one functionally required application program (such as the audio playback function and image playback function); the data memory area may store data (such as audio data and phone book) created according to the use of the terminal 1600. Moreover, the memory unit 1620 may include high-speed random-access memory and may further include non-volatile memory, such as at least one disk memory device, flash device, or other volatile solid-state memory devices. Accordingly, the memory unit 1620 may further include a memory controller to provide the processor 1680 and the input unit 1630 with access to the memory unit 1620.

The input unit 1630 may be configured to receive information, such as numbers or characters, and create input of signals from keyboards, touch screens, mice, joysticks, optical or track balls, which may be related to user configuration and function control. Specifically, the input unit 1630 may include a touch-sensitive surface 1631 and other input devices 1632. The touch-sensitive surface 1631, also called a touch screen or a touch pad, may collect touch operations by a user on or close to it (e.g., touch operations on the touch-sensitive surface 1631 or close to the touch-sensitive surface 1631 by the user using a finger, a stylus, and/or any other appropriate object or attachment) and drive corresponding connecting devices according to preset programs. The touch-sensitive surface 1631 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place wherein the touch screen may be contacted, and then send the touch point coordinates information to the processor 1680. The touch controller may also receive commands sent by the processor 1680 for execution. Moreover, the touch-sensitive surface 1631 may be realized by adopting multiple types of touch-sensitive surfaces, such as resistive, capacitive, infrared, and/or surface acoustic sound wave surfaces. Besides the touch-sensitive surface 1631, the input unit 1630 may further include other input devices 1632, such as the input devices 1632 may also include, but not limited to, one or multiple types of physical keyboards, functional keys (for example, volume control buttons and switch buttons), trackballs, mice, and/or joysticks.

The display unit 1640 may be configured to display information input by the user, provided to the user, and various graphical user interfaces on the terminal 1600. These graphical user interfaces may be composed of graphics, texts, icons, videos, and/or combinations thereof. The display unit 1640 may include a display panel 1641. The display panel 1641 may be in a form of an LCD (Liquid Crystal Display), an OLED (Organic Light-Emitting Diode), or any other form available at the time of the present disclosure or one of ordinary skill in the art would have perceived at the time of the present disclosure. Furthermore, the touch-sensitive surface 1631 may cover the display panel 1641. After the touch-sensitive surface 1631 detects touch operations on it or nearby, it may transmit signals of the touch operations to the processor 1680 to determine the type of the touch event. Afterwards, according to the type of the touch event, the processor 1680 may provide corresponding visual output on the display panel 1641. In FIG. 16, the touch-sensitive surface 1631 and the display panel 1641 realize the input and output functions as two independent components. Alternatively, the touch-sensitive surface 1631 and the display panel 1641 may be integrated to realize the input and output functions.

The terminal 1600 may further include at least one type of sensor 1650, for example, an optical sensor, a motion sensor, and other sensors. An optical sensor may include an environmental optical sensor and a proximity sensor, wherein the environmental optical sensor may adjust the brightness of the display panel 1641 according to the brightness of the environment, and the proximity sensor may turn off the display panel 1641 and/or back light when the terminal 1600 may be moved close an ear of the user. As a type of motion sensor, a gravity acceleration sensor may detect the magnitude of acceleration in various directions (normally three axes) and may detect the magnitude of gravity and direction when it may be stationary. The gravity acceleration sensor may be used in applications of recognizing the attitude of the terminal 1600 (e.g., switching screen orientation, related games, and magnetometer calibration) and functions related to vibration recognition (e.g., pedometers and tapping); the terminal 1600 may also be configured with a gyroscope, barometer, hygrometer, thermometer, infrared sensor, and other sensors.

An audio circuit 1660, a speaker 1661, and a microphone 1662 may provide audio interfaces between the user and the terminal 1600. The audio circuit 1660 may transmit the electric signals, which may be converted from the received audio data, to the speaker 1661, and the speaker 1661 may convert them into the output of sound signals; on the other hand, the microphone 1662 may convert the collected sound signals into electric signals, which may be converted into audio data after they may be received by the audio circuit 1660; after the audio data may be output to the processor 1680 for processing, it may be transmitted via the RF circuit 1610 to, for example, another terminal; or the audio data may be output to the memory unit 1620 for further processing. The audio circuit 1660 may further include an earplug jack to provide communication between earplugs and the terminal 1600.

WiFi may be a short-distance wireless transmission technology. Via the WiFi module 1670, the terminal 1600 may help users receive and send emails, browse web pages, and visit streaming media. The WiFi module 1670 may provide the user with wireless broadband Internet access.

The processor 1680 may be the control center of the terminal 1600. The processor 1680 may connect to various parts of the entire terminal 1600 utilizing various interfaces and circuits. The processor 1680 may conduct overall monitoring of the terminal 1600 by running or executing the software programs and/or modules stored in the memory unit 1620, calling the data stored in the memory unit 1620, and executing various functions and processing data of the terminal 1600. The processor 1680 may include one or multiple processing core(s). The processor 1680 may integrate an application processor and a modem processor, wherein the application processor may process the operating system, user interface, and application programs, and the modem processor may process wireless communication.

The terminal 1600 may further include a power supply 1690 (for example a battery), which supplies power to various components. The power supply may be logically connected to the processor 1680 via a power management system so that charging, discharging, power consumption management, and other functions may be realized via the power management system. The power supply 1690 may further include one or more than one DC or AC power supply, a recharging system, a power failure detection circuit, a power converter or inverter, a power status indicator, and other random components.

Further, the terminal 1600 may also include a camera, Bluetooth module, etc., which may be not shown in FIG. 16. Also, the display unit of the terminal 1600 may be a touch screen display, and the terminal 1600 may further include at least one non-transitory processor-readable memory, and one or more programs (i.e., sets of instructions), wherein the one or more programs may be stored in the memory, and may be configured to be executed by one or more processors to perform the methods in the present disclosure.

Figure 17:
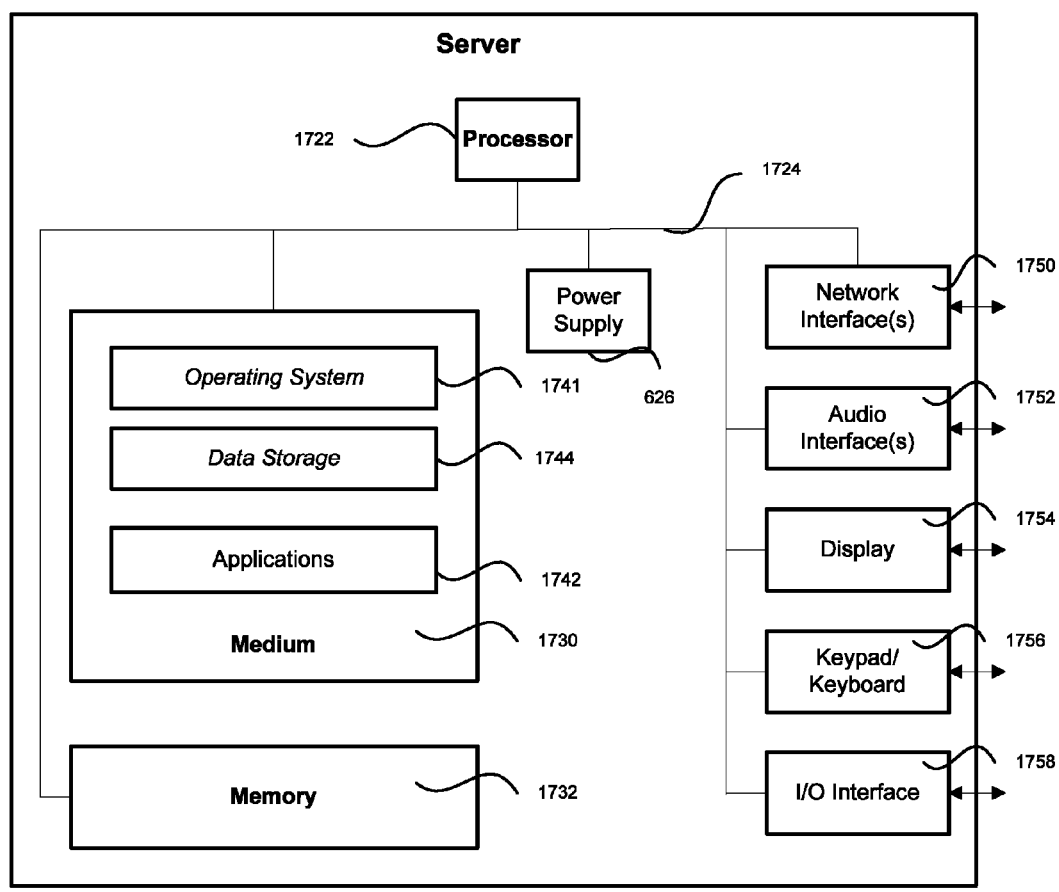
FIG. 17 is a schematic diagram illustrating an example embodiment of a server.

FIG. 17 is a schematic diagram illustrating an example embodiment of a server. The server 1700 may be the server as described in the present disclosure and may connect to the first and second terminals 11, 12 locally or via a network. A Server 1700 may vary widely in configuration or capabilities, but it may include one or more central processing units 1722 and memory 1732, one or more medium 1730 (such as one or more mass storage devices) storing application programs 1742 or data 1744, one or more power supplies 1726, one or more wired or wireless network interfaces 1750, one or more input/output interfaces 1758, and/or one or more operating systems 1741, such as Windows Server™, Mac OS X™, Unix™, Linux™, FreeBSD™, or the like. Thus a server 1700 may include, as examples, dedicated rack-mounted servers, desktop computers, laptop computers, set top boxes, mobile computational devices such as smart phones, integrated devices combining various features, such as two or more features of the foregoing devices, or the like.

The server 1700 may serve as a search server or a content server. A content server may include a device that includes a configuration to provide content via a network to another device. A content server may, for example, host a site, such as a social networking site, examples of which may include, but are not limited to, Flicker™, Twitter™, Facebook™, Linked In™, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor type or programmable consumer electronics, etc.

Merely for illustration, only one processor will be described in terminals and servers that execute operations and/or method steps in the following example embodiments. However, it should be note that the terminals in the present disclosure may also include multiple processors, thus operations and/or method steps that are performed by one processor as described in the present disclosure may also be jointly or separately performed by the multiple processors. For example, if in the present disclosure a processor of a terminal executes both step A and step B, it should be understood that step A and step B may also be performed by two different processors jointly or separately in the terminal (e.g., the first processor executes step A and the second processor executes step B, or the first and second processors jointly execute steps A and B).

In both the servers and the terminals in the present application, the processors may be in communication with the non-transitory processor-readable storage media in the respective servers or terminals. The storage media may have sets of instructions stored therein, so that the processors may execute the instructions and perform the methods introduced in the example embodiments of the present disclosure, or the terminals and/or servers may server as the devices and/or systems of the present disclosure.

Further, because the terminals in the present disclosure may contact each other through the server, in the below methods, the server be a party during a communications between the terminals although the server is not mentioned. For example, when the present disclosure states that a terminal updates its geographic location, it may mean the terminal updates its geographic location independently; or it may mean the terminal sends a signal to the server, instructing the server to obtain the updated geographic location information of the terminal, and then may receive the geographic location information from the server. When the present disclosure states that a first terminal sends a signal to a second terminal, it may mean the first terminal sends the signal to the second terminal directly; or it may mean the first terminal sends the signal to the server, and then the server sends the signal to the second terminal.

Figure 2:
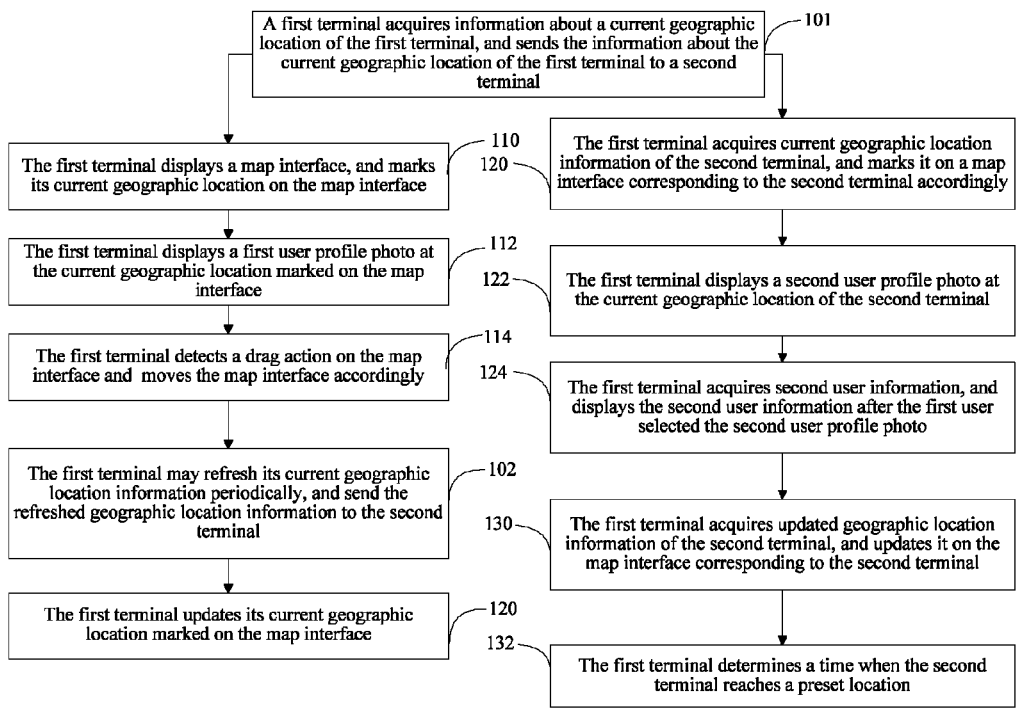
FIG. 2 is a flowchart of a method for sharing a geographic location from a perspective of a first terminal, according to the example embodiments of the present disclosure.

FIG. 2 is a flowchart of a method for sharing a geographic location from a perspective of a first terminal, according to an example embodiment of the present disclosure. The method FIG. 2, a process of the method according to the example embodiments of the present disclosure may include the following steps:

101: A first terminal may acquire and/or obtain information about a current geographic location of the first terminal, and may send the current geographic location information of the first terminal to a second terminal remote from the first terminal, wherein the second terminal may be in a social communication with the first terminal. For example, the second terminal may be using the same social networking application with the first terminal.

102: The first terminal may refresh the information about its current geographic location at an interval of a preset period of time, and send the updated geographic location information to the second terminal at an interval of a preset period of time, wherein the second terminal may be one or more terminals 1600 shown in FIG. 16.

The step of sending the current geographic location information of the first terminal to the second terminal may include sending the current geographic location information of the first terminal to a server, and the server forwarding the current geographic location information of the first terminal to the second terminal.

The step of sending the updated geographic location information of the first terminal to the second terminal may include sending the updated geographic location information of the first terminal to the server, and the server forwarding the updated geographic location information of the first terminal to the second terminal.

After the first terminal has acquired and/or obtained the current geographic location information of the first terminal, the method may further include Step 110, wherein the first terminal may display a map interface on the first terminal to a user, and mark the current geographic location of the first terminal on the map interface according to the current geographic location information of the first terminal.

After the first terminal has refreshed and/or updated the current geographic location information of the first terminal at an interval of the preset period of time, the method may further include Step 120, wherein the first terminal may update, according to the updated geographic location information of the first terminal, the current geographic location of the first terminal marked on the map interface.

After the step of marking the current geographic location of the first terminal on the map interface according to the current geographic location information of the first terminal, the method may further include Step 112, wherein the first terminal may display, at the current geographic location of the first terminal marked on the map interface, a user ("the first user") profile photo corresponding to the first terminal.

The step of displaying a map interface may include displaying one map interface, wherein the map interface corresponds to all second terminals.

The step of displaying a map interface may also include displaying map interfaces whose quantity may be the same as that of second terminals, wherein each map interface corresponds to one second terminal.

After the step of sending the current geographic location information of the first terminal to a second terminal, the method may further include Step 120, wherein the first terminal may acquire information about a current geographic location of the second terminal, and mark the current geographic location of the second terminal on a map interface corresponding to the second terminal according to the current geographic location information of the second terminal. This step may include, wherein the first terminal may receive the current geographic location information of the second terminal forwarded by the server.

After the step of acquiring information about a current geographic location of the second terminal, the method further may include Step 130, wherein the first terminal may acquire the updated geographic location information of the second terminal, and updating, according to the updated geographic location information of the second terminal, the current geographic location of the second terminal marked on the map interface corresponding to the second terminal. This step may include receiving the updated geographic location information of the second terminal forwarded by the server.

After the step of marking the current geographic location of the second terminal on a map interface corresponding to the second terminal according to the current geographic location information of the second terminal, the method further may include Step 122, wherein the first terminal may display, at the current geographic location of the second terminal marked on the map interface corresponding to the second terminal, a user ("the second user") profile photo corresponding to the second terminal.

After the step of displaying, at the current geographic location of the second terminal marked on the map interface corresponding to the second terminal, the second user profile photo, the method may further include Step 124, wherein the first terminal may acquire user information ("the second user information") corresponding to the second terminal, and displaying the second user information after the first user selected the second user profile photo.

After the step of displaying, at the current geographic location of the first terminal marked on the map interface, the second user profile photo, the method further may include Step 114, wherein the first terminal may detect a drag action executed on the map interface; and move the map in the map interface according to the detected drag action, and hiding the user profile photo displayed on the map interface, and after a preset period of time since the end of the drag action, displaying the hidden user profile photo on the map interface.

After the step of displaying a map interface, the method further may include, wherein the first terminal may perform information interaction with the second terminal, wherein the information interaction may at least include one of voice information interaction, text information interaction, picture information interaction, and video information interaction.

After the step of acquiring the updated geographic location information of the second terminal, the method may further include Step 132, wherein the first terminal may determine a time the second terminal needs to reach a preset location. To this end, the first terminal may dynamically calculate a travelling path between the second terminal and the preset location and may display the travelling path as textual descriptions on the map interface, and/or display the travelling path by highlighting the corresponding streets, and/or converting the travelling path to audio driving direction and broadcasting the audio driving direction through a speaker of the first terminal. Additionally, the first terminal may also receive speed information of the second terminal as well as traffic information along the travelling path, and then calculate and display the time based thereon. Further, the preset location may be the current location of the first terminal or any other moving object. For example, the first terminal may also provide an option to the first user to dynamically display a distance and/or a path between its current location and the current location of the second terminal. For example, when the first terminal locates in point A and the second terminal locates in point B, and both the first terminal and the second terminal are moving. Upon the first user's selection, the first terminal may dynamically display both the first terminal's location A and the second terminal's location B. The first terminal may also display a traveling path connecting between A and B, and display a distance between A and B. Further, the first terminal may also receive traffic information on the traveling path, and display a time it will meet the second terminal based on the current travel speed of the first terminal and the second terminal as well as the traffic information along the travel path. Moreover, in the above example embodiment, the above calculation may be performed by the first terminal locally. The calculation may also be performed by the server, and the first terminal may simply receive and display the result of the calculation.

Figure 3:
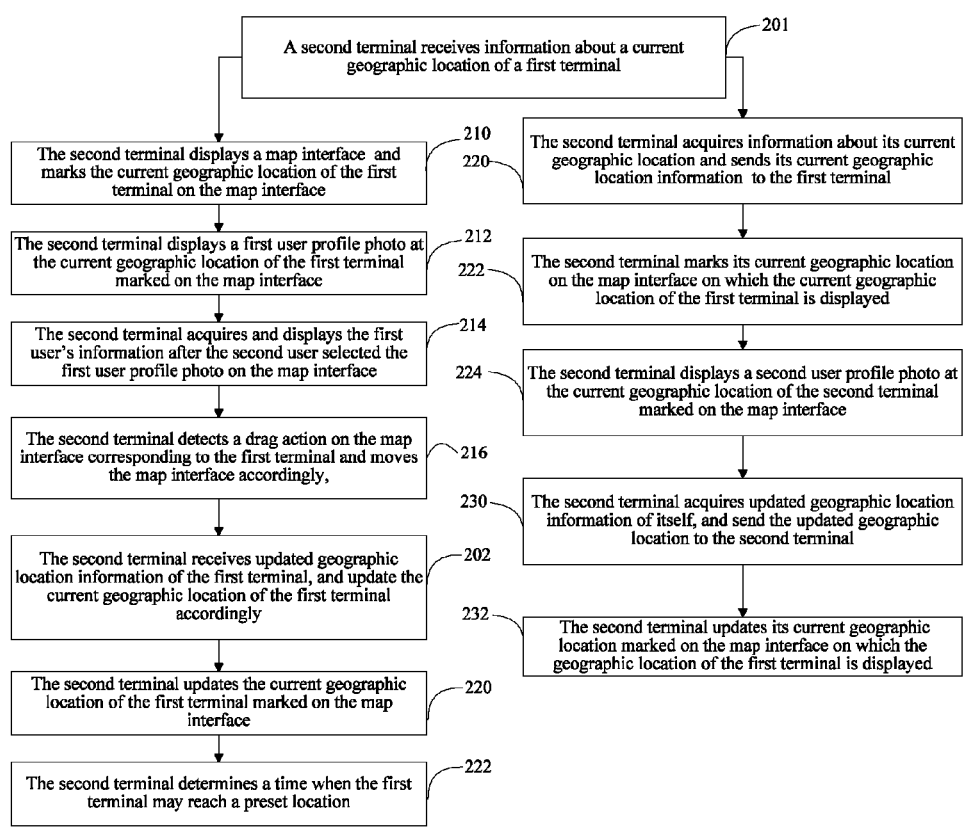
FIG. 3 is a flowchart of another method for sharing a geographic location from perspective of a second terminal, according to the example embodiments of the present disclosure.

FIG. 3 is a flowchart of another method for sharing a geographic location from a perspective of a second terminal, according to the example embodiment of the present disclosure. The method may include the following steps:

201: A second terminal may receive information about a current geographic location of a first terminal sent by the first terminal.

202: the second terminal may receive the updated geographic location information of the first terminal sent by the first terminal, and update the current geographic location of the first terminal accordingly, wherein the first terminal may be one or more terminals 1600 as shown in FIG. 16.

The step of receiving information about the current geographic location of the first terminal may include receiving the current geographic location information of the first terminal forwarded by a server.

The step of receiving the updated geographic location information of the first terminal may include receiving the updated geographic location information of the first terminal forwarded by the server.

After the step of receiving information about a current geographic location of a first terminal sent by the first terminal, the method further may include Step 210, wherein the second terminal may display a map interface on the second terminal corresponding to the location of the first terminal, and mark the current geographic location of the first terminal on the map interface correspondingly.

After the step of receiving the updated geographic location information of the first terminal, the method may further include Step 220, wherein the second terminal may update, according to the updated geographic location information of the first terminal, the current geographic location of the first terminal marked on the map interface corresponding to the first terminal.

After the step of marking the current geographic location of the first terminal on the map interface, the method further may include Step 212, wherein the second terminal may display, at the current geographic location of the first terminal marked on the map interface corresponding to the first terminal, a first user profile photo.

The step of displaying a map interface corresponding to the first terminal may include displaying one map interface, wherein the one map interface corresponds to all first terminals. For example, if the second terminal receives current location information of 3 first terminals, the second terminal may display 3 current locations in a same map interface. Each current location corresponds to one of the 3 first terminals. Alternatively, the step of displaying a map interface corresponding to the first terminal may include displaying map interfaces whose quantity is the same as the number of first terminals, wherein each map interface corresponds to one first terminal.

After the step of receiving information about a current geographic location of the first terminal sent by the first terminal, the method further may include Step 220, wherein the second terminal may acquire information about the current geographic location of the second terminal, and send the current geographic location information of the second terminal to the first terminal.

The step of sending the current geographic location information of the second terminal to the first terminal may include: sending the current geographic location information of the second terminal to the server, and the server forwarding the current geographic location information of the second terminal to the first terminal.

After the step of acquiring information about the current geographic location of the second terminal, the method may further include Step 222, wherein the second terminal may mark its current geographic location on the map interface on which the current geographic location of the first terminal is displayed.

After the step of acquiring information about the current geographic location of the second terminal, the method may further include Step 230, wherein the second terminal may refresh and/or update its current geographic location information at an interval of a preset period of time, and send the updated geographic location information of the second terminal to the first terminal.

The sending of the updated geographic location information of the second terminal to the first terminal may include sending the updated geographic location information of the second terminal to the server, and the server forwarding the updated geographic location information of the second terminal to the first terminal.

After the step of refreshing and/or updating the current geographic location information of the second terminal at an interval of a preset period of time, the method may further include Step 232, wherein the second terminal may update its current geographic location marked on the map interface on which the geographic location of the first terminal is displayed.

After the step of marking the current geographic location of the second terminal on the map interface on which the geographic location of the first terminal is displayed, the method may further include Step 224, wherein the second terminal may display a second user profile photo at the current geographic location of the second terminal marked on the map interface, wherein the second user is the user of the second terminal.

After the step of displaying the first user profile photo at the current geographic location of the first terminal marked on the map interface, the method may further include Step 212, wherein the second terminal may acquire the first user's information corresponding to the first terminal, and display the first user information after the second user selected the first user profile photo on the map interface.

After the step of displaying the first user profile photo at the current geographic location of the first terminal marked on the map interface the method further may include Step 216, wherein the second terminal may detect a drag action executed on the map interface corresponding to the first terminal; and move the map in the map interface corresponding to the first terminal accordingly, hide the user profile photo displayed on the map interface corresponding to the first terminal until after a preset period of time since the end of the drag action, and then display the hidden user profile photo on the map interface corresponding to the first terminal.

After the step of displaying a map interface corresponding to the first terminal, the method may further include performing information interaction with the first terminal, wherein the information interaction at least may include one of voice information interaction, text information interaction, picture information interaction, and video information interaction.

After the step of refreshing and/or updating the current geographic location of the first terminal the method further may include Step 222, wherein the second terminal may determine a time the first terminal may need to reach a preset location. To this end, the second terminal may dynamically calculate a travelling path between the first terminal and the preset location and may display the travelling path as textual description on the map interface, and/or display the travelling path by highlighting the corresponding streets, and/or converting the travelling path as audio driving directions through a speaker of the second terminal. Additionally, the second terminal may also receive speed information of the first terminal as well as traffic information along the travelling path, and then calculate and display the time based thereon. Further, the preset location may be the current location of the second terminal or any other moving object. For example, the second terminal may also provide an option to the second user to dynamically display a distance and/or a path between its current location and the current location of the first terminal. For example, when the first terminal locates in point A and the second terminal locates in point B, and both the first terminal and the second terminal are moving. Upon the second user's selection, the second terminal may dynamically display both the first terminal's location A and the second terminal's location B. The second terminal may also display a traveling path connecting between A and B, and display a distance between A and B. Further, the second terminal may also receive traffic information on the traveling path, and display a time it will meet the first terminal based on the current travel speed of the first terminal and the second terminal as well as the traffic information along the travel path. Moreover, in the above example embodiment, the above calculation may be performed by the second terminal locally. The calculation may also be performed by the server, and the second terminal may simply receive and display the result of the calculation.

In the method according to the example embodiments of the present disclosure, the first terminal may send the current geographic location information of the first terminal to at least one second terminal, and after refreshing and/or updating the information about its current geographic location at an interval of a preset period of time, may send the updated geographic location information to the second terminal, thereby dynamically sharing a geographic location with the second terminal in real-time. As a result, the second user corresponding to the second terminal can position the first user corresponding to the first terminal according to the updated geographic location information of the first terminal more accurately.

Figure 4:
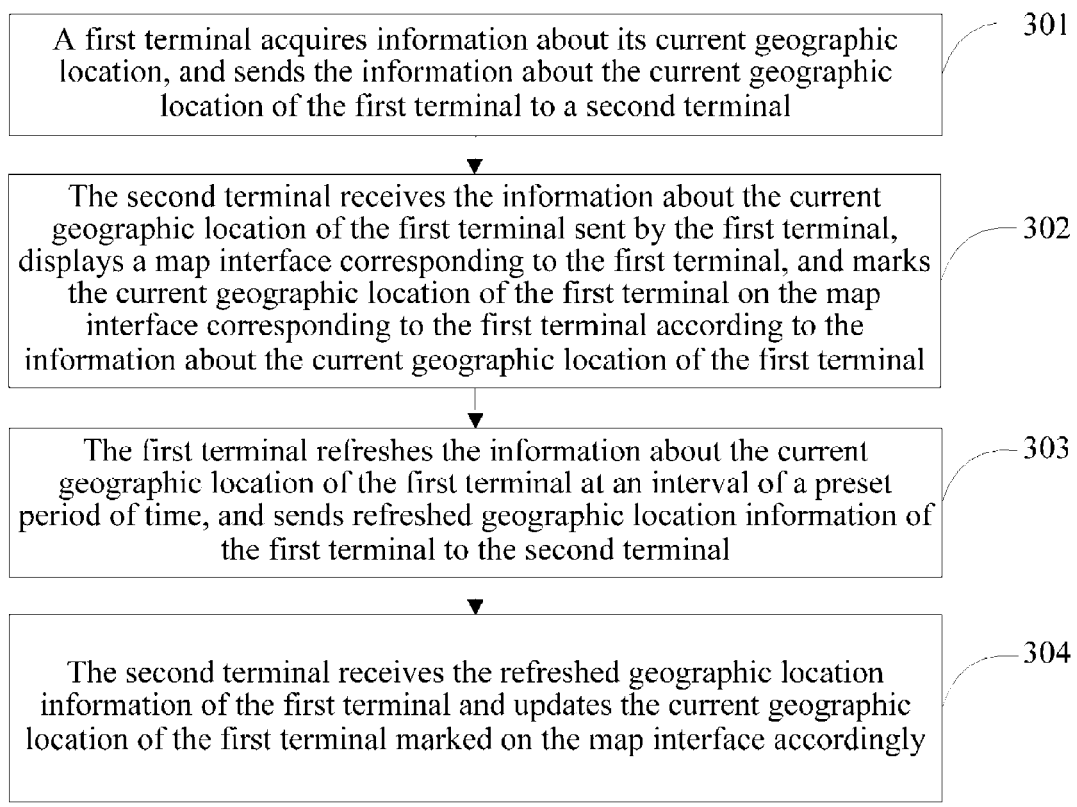
FIG. 4 is a flowchart of a method for sharing a geographic location according to the example embodiments of the present disclosure.

FIG. 4 is a flowchart of a method for sharing a geographic location according to another example embodiment of the present disclosure. The method for sharing a geographic location according to the this embodiment will be described with reference to the content of the first example embodiment, and by using an example wherein a first terminal shares its dynamic geographic location with a second terminal in real-time, and a second user corresponding to the second terminal tracks a real-time geographic location of a first user corresponding to the first terminal according to geographic location information sent by the first terminal to the second terminal. The method may include the following steps:

301: A first terminal may acquire and/or obtain information about its current geographic location, and may send the current geographic location information to a second terminal.

Figure 5:
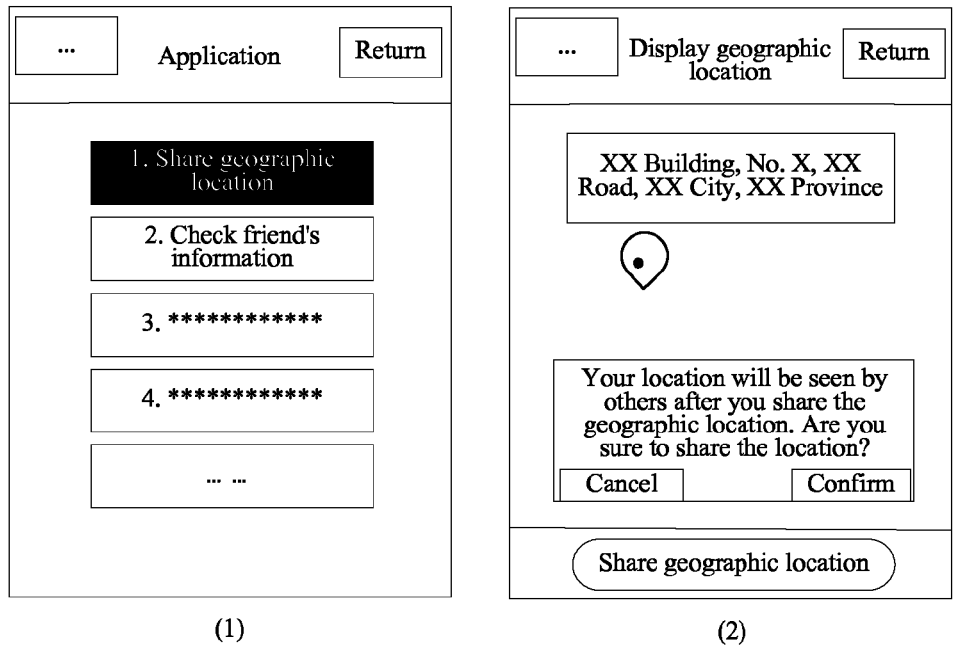
FIG. 5 is a schematic view of an interface for displaying formation about a current geographic location of a first terminal according to the example embodiments of the present disclosure.

The current geographic location information of the first terminal may represent information about a current geographic location of a first user corresponding to the first terminal. Therefore, the step of a first terminal acquiring information about a current geographic location of the first terminal may be triggered after the first terminal receives an instruction from the first user to share his/her geographic location information. The instruction that the user determines to share geographic location information may be acquired in various ways. For example, the first terminal may display a manual with a preset a service option of sharing a geographic location to the user, as shown in FIG. 5(1), and then detect whether the user selects the service option. When the first terminal detects that the first user selects the service option, the first terminal may use the detection result an instruction that the user determines to share geographic location information. Accordingly, the first terminal may be triggered to acquire its current geographic location information. In addition, after the first terminal acquired and/or obtained the current geographic location information of the first terminal in other application scenarios, the first terminal may further set a confirmation dialog box, and then detect whether the user clicks a "conform" option in the confirmation dialog box; when the first terminal detects that the user clicks the "conform" option in the confirmation dialog box, the detection result may be used as the acquired instruction that the user determines to share geographic location information.

Apart from the above two ways for acquiring the instruction that the user determines to share geographic location information, there may be other manners for acquiring the instruction that the user determines to share geographic location information, and no matter which manner may be used to acquire the instruction that the user determines to share geographic location information, the first terminal can be triggered to acquire the current geographic location information of the first terminal.

Figure 6:
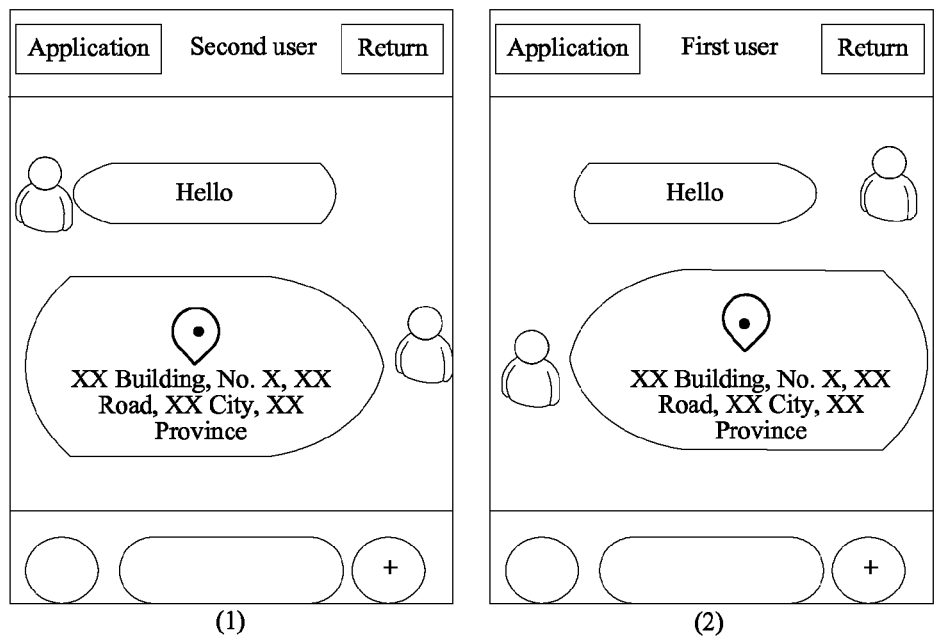
FIG. 6 is a schematic view of a prompt interface for sharing a geographic location according to the example embodiments of the present disclosure.

Further, the manner in which the first terminal acquires and/or obtains the current geographic location information of the first terminal may not be specifically limited by the embodiments of the present disclosure. In an implementation, the first terminal may obtain the current geographic location of the first terminal through positioning by using a Global Positioning System (GPS) navigation system installed on the first terminal, and use a positioning result as the acquired geographic location information. Further, the content of the current geographic location information acquired by the first terminal may not be specifically limited by the embodiments of the present disclosure either. For example, the content of the geographic location information may be a street view and/or a perspective view of the current geographic location of the first terminal obtained by the GPS navigation system through positioning, a geographic location coordinate, or a POI (Point of Interest). No matter which manner the first terminal uses to acquire the current geographic location information of the first terminal, when the first terminal sends the current geographic location information of the first terminal to at least one second terminal, the example embodiments in the present disclosure do not limit the quantity of second terminals. In addition, the first terminal may send the current geographic location information of the first terminal to at least one second terminal in many manners, which are not specifically defined by the embodiment of the present disclosure. For example, if the first user corresponding to the first terminal and the second user corresponding to the second terminal log in the same application program (e.g., WeChat, an instant messaging application) through their terminals, after connecting to a server corresponding to the application program through a network, the first terminal transmits the acquired current geographic location information of the first terminal to the server corresponding to the application program through the network, and the server then forwards the information to the second terminal. If the first terminal and the second terminal are connected in a Peer to Peer (P2P) manner, the first terminal may directly send the acquired current geographic location information of the first terminal to the second terminal. No matter which manner the first terminal uses to send the current geographic location information of the first terminal to the second terminal, the first terminal can display the current geographic location information of the first terminal on an interface through which the first user and the second user interact with each other, and the embodiments of the present disclosure does not limit the specific displaying manner; the manner for displaying the current geographic location information of the first terminal on the interface through which the first user and the second user interact with each other may include, but may be not limited to, the manner shown in FIG. 6(1).

302: The second terminal may receive the current geographic location information of the first terminal sent by the first terminal, display a map interface corresponding to the first terminal, and mark the current geographic location of the first terminal on the map interface corresponding to the first terminal according to the current geographic location information of the first terminal.

In this step, after the first terminal sent the current geographic location information to the second terminal, the second terminal may receive the current geographic location information of the first terminal sent by the first terminal. The manner in which the second terminal receives the current geographic location information of the first terminal are not specifically limited by the example embodiments of the present disclosure. For example, as described in the content of Step 301, if the first user corresponding to the first terminal and the second user corresponding to the second terminal log in the same application program through their terminals, and after connecting to a server corresponding to the application program through a network, the first terminal may transmit the acquired current geographic location information of the first terminal to the server corresponding to the application program through the network, the second terminal may receive the current geographic location information of the first terminal from the server. If the first terminal and the second terminal are connected in a P2P manner, the second terminal may directly receive the current geographic location information of the first terminal from the first terminal. No matter which manner the second terminal uses to receive the current geographic location information of the first terminal sent by the first terminal, the second terminal can display the current geographic location information of the first terminal on the interface through which the first user and the second user interact with each other, and the embodiment of the present disclosure does not limit the specific displaying manner; the manner for displaying the current geographic location information of the first terminal on the interface through which the first user and the second user interact with each other may include, but may be not limited to, the manner shown in FIG. 6(2).

Further, after the second terminal received the current geographic location information of the first terminal sent by the first terminal, the second terminal may acquire the specific current geographic location of the first terminal according to the received current geographic location information of the first terminal. At this point, the second terminal may display a map interface corresponding to the first terminal, and marks the current geographic location of the first terminal on the map interface corresponding to the first terminal in order to clearly display the current geographic location of the first terminal to the user. Manners in which the second terminal displays the map interface corresponding to the first map may include, but is not limited to, the following two manners:

The first map-interface-displaying manner: the second terminal displays one map interface, wherein the one map interface corresponds to all first terminals. In the first map-interface-displaying manner, all the first terminals correspond to one map interface, that is, current geographic locations of all the first terminals may be displayed on one map interface. For example, when the second user corresponding to the second terminal performs group session with first users corresponding to all the first terminals, the first users corresponding to all the first terminals and the second user corresponding to the second terminal may be in one group; in this case, the second terminal displays, on one map interface, current geographic locations of all the first terminals in the group.

The second map-interface-displaying manner: the second terminal displays map interfaces whose quantity may be the same as that of first terminals, wherein each map interface corresponds to one first terminal. In the map-interface-displaying manner, each first terminal corresponds to one map interface, which can be comprehended as the second user corresponding to the second terminal having a separate secession with the first user corresponding to each first terminal. Therefore, the second terminal separately displays, on different map display interfaces, current geographic locations of the first users corresponding to the first terminals.

Figure 7:
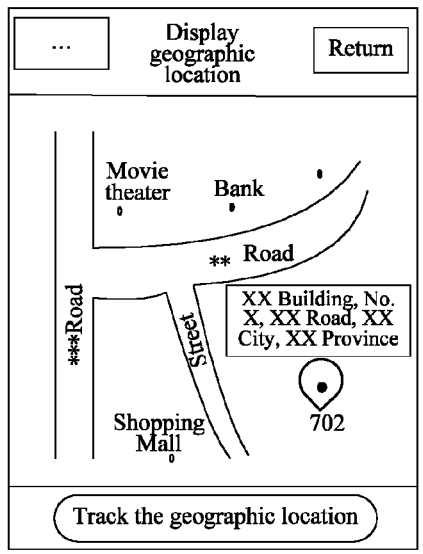
FIG. 7 is a schematic view of a first map interface according to the example embodiments of the present disclosure.

The manner in which the second terminal marks the current geographic location of the first terminal on the map interface corresponding to the first terminal may include, but is not limited to, marking the current geographic location of the first terminal on the map interface corresponding to the first terminal with a bubble 702, as shown in FIG. 7. Apart from this marking manner, other marking manners may also be used, which are not limited by the present disclosure.

After the second terminal displayed the map interface corresponding to the first terminal, and marked the current geographic location of the first terminal on the map interface corresponding to the first terminal, to avoid affecting the interaction between the second user and the first user, the method according to the example embodiments further supports an information interaction process between the second terminal and the first terminal. In an implementation, the information interaction may include, but is not limited to, voice information interaction, text information interaction, picture information interaction, and video information interaction, and the specific information interaction is not limited in this embodiment.

Figure 8:
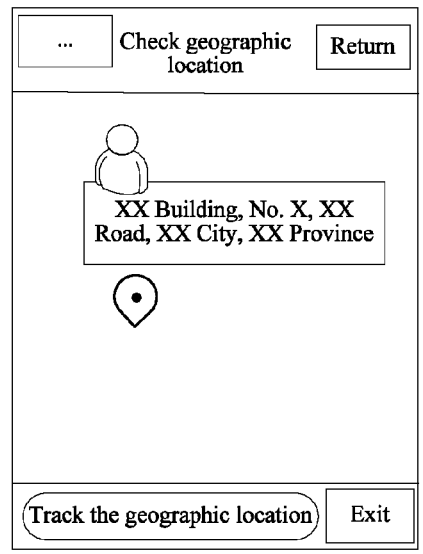
FIG. 8 is a schematic view of a second map interface according to the example embodiments of the present disclosure.

After the second terminal marked the current geographic location of the first terminal on the map interface corresponding to the first terminal according to the current geographic location information of the first terminal, the second terminal may further distinguish different first terminals with different colors, such as using different balloons with different colors, and/or may further display, at the current geographic location of the first terminal marked on the map interface corresponding to the first terminal, a first user profile photo, so as to ensure that when the second map-interface-displaying manner may be used, that is, when all the first terminals correspond to one map interface, the second terminal can distinguish the first users corresponding to the first terminals from each other and the geographic locations corresponding to the first terminals from each other according to the user profile photos. In an implementation, after the second terminal displays, at the current geographic location of the first terminal marked on the map interface corresponding to the first terminal, the first user profile photo, the map interface may be as shown in FIG. 8.

Figure 9:
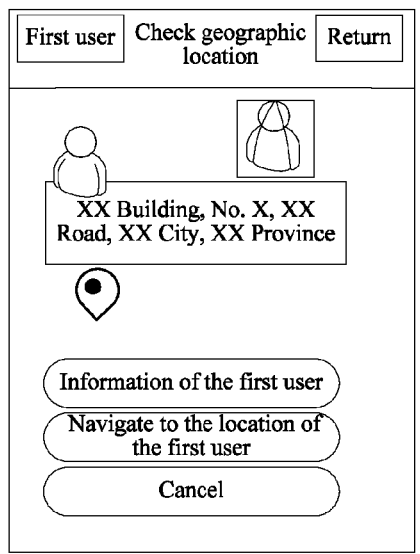
FIG. 9 is a schematic view of a third map interface according to the example embodiments of the present disclosure.

Further, after the second terminal displayed, at the current geographic location of the first terminal marked on the map interface corresponding to the first terminal, the first user profile photo, the method according to this example embodiment may further include: the second terminal may acquire and/or obtain user information corresponding to the first terminal, and display the user information corresponding to the first terminal after the first user profile photo is selected. The user information corresponding to the first terminal may be user information of the first user, wherein the user information may include, but may be not limited to, nickname, address, and age of the first user, and the present disclosure does not limit the specific user information. When the second terminal acquires and/or obtains the user information corresponding to the first terminal, if the first user and the second user register for the same application program, a server corresponding to the application program may store the user information of the first user. Therefore, the second user may be connected to the server corresponding to the application program so as to request the user information of the first user from the server. Apart from this manner for acquiring the user information corresponding to the first terminal, other acquisition manners may also be used, which are not limited by the present disclosure. No matter which manner is used to acquire the user information corresponding to the first terminal, after the first user profile photo is selected, this example embodiment does not limit the manner in which the second terminal displays the user information corresponding to the first terminal. The display manner may include, but is not limited to, setting and displaying other options related to the user corresponding to the first terminal, wherein the other options include, but are not limited to, an option for checking user information, and an option for navigating to the location of the user, and an interface for displaying the options may be as shown in FIG. 9. When the option for checking user information is selected, the user information corresponding to the first terminal may be displayed. The manner for displaying the user information corresponding to the first terminal may include, but is not limited to, displaying the user information corresponding to the first terminal by using a pop-up information bar.

Figure 10:
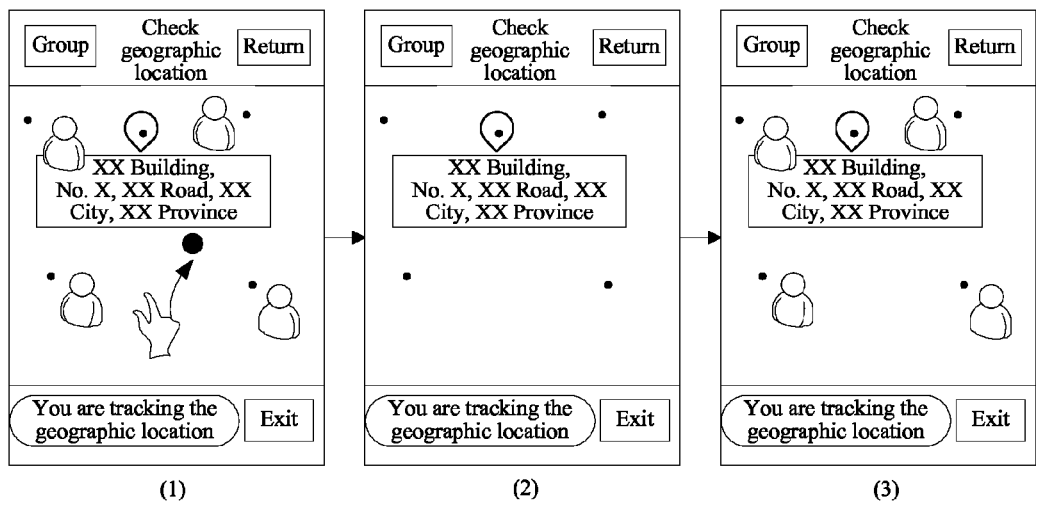
FIG. 10 is a schematic view of a fourth map interface according to the example embodiments of the present disclosure.

After the second terminal displays the first user profile photo at the current geographic location of the first terminal marked on the map interface corresponding to the first terminal, to make it easy for the user to check the map interface corresponding to the first terminal, in the method according to this embodiment, the second terminal may further support a drag action of the user on the map interface corresponding to the first terminal, so that the user checks the geographic location of the first terminal more easily. Therefore, after the second terminal displays the first user profile photo at the current geographic location of the first terminal marked on the map interface corresponding to the first terminal, the second terminal may further detect a drag action on the map interface corresponding to the first terminal, and move the map interface corresponding to the first terminal according to a detected drag action. For example, the map interface corresponding to the first terminal displayed by the second terminal may include, but is not limited to, the map interface shown in FIG. 10(1). As the map interface corresponding to the first terminal displays the first user profile photo, if multiple first terminals share the geographic locations with the second terminal and the second terminal uses the second map-interface-displaying manner, the map interface of the second terminal displays multiple user profile photos corresponding to the first terminals. To display information on the map interface corresponding to the first terminal more clearly to the user, when the second terminal detects a drag action and moves the map interface corresponding to the first terminal according to the drag action, the second terminal may hide the user profile photos displayed on the map interface corresponding to the first terminal, so as to clearly display the map interface. For example, the map interface corresponding to the first terminal displayed by the second terminal at this time may include, but is not limited to, the map interface shown in FIG. 10(2). Subsequently, to avoid affecting the display of the user profile photo, after a preset period of time since the end of the drag action, the second terminal may further display the hidden user profile photo on the map interface corresponding to the first terminal. For example, the map interface corresponding to the first terminal displayed by the second terminal at this time may include, but may be not limited to, the map interface shown in FIG. 10(3).

303: The first terminal may refresh and/or update the current geographic location information of the first terminal at an interval of a preset period of time, and may send the updated geographic location information of the first terminal to the second terminal.

In this step, because the geographic location of the first terminal may change at any time, in order to share the dynamic geographic location with the second terminal in real-time, the first terminal needs to refresh the information about its current geographic location at an interval of a preset period of time and send the updated geographic location information to the second terminal, so as to ensure that the second terminal can obtain the real-time geographic location of the first terminal. For example, the first terminal may update and/or refresh its geographic location periodically at a predetermined frequency. The preset period of time serving as the interval may be set to any value, and in an implementation, to make the second terminal capable of obtaining the movement situation or location change situation of the first terminal in time, the preset period of time serving as the interval may be short, for example, the first terminal may refresh the current geographic location information every second. The preset period of time serving as the interval may also be other values, which is not limited by the present disclosure, as long as it is ensured that after the current geographic location of the first terminal changes, the first terminal can perform refreshing and/or updating in time and notify the second terminal. The manner in which the first terminal may refresh and/or update the current geographic location information of the first terminal is not limited by the embodiment of the present disclosure. In an implementation, the refreshing and/or updating manner may include, but is not limited to, that the first terminal obtains the current geographic location through positioning by using the GPS navigation system installed on the first terminal, uses obtained geographic location information as the updated geographic location information, and may send the information to the second terminal. The manner for sending the updated geographic location information of the first terminal to the second terminal may be the same as the manner for sending the current geographic location information of the first terminal to at least one second terminal in Step 301.

304: The second terminal may receive the updated geographic location information of the first terminal sent by the first terminal, and update the current geographic location of the first terminal marked on the map interface corresponding to the first terminal accordingly.

Figure 11:
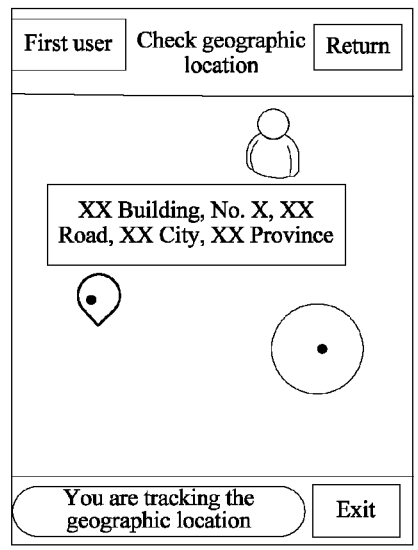
FIG. 11 is a schematic view of a fifth map interface according to the example embodiments of the present disclosure.

In this step, after the first terminal sent the updated geographic location information to the second terminal, the second terminal may receive the updated geographic location information sent by the first terminal, so as to acquire the real-time geographic location of the first terminal. The manner in which the second terminal may receive the updated geographic location information sent by the first terminal may be the same as the manner in which the second terminal may receive the current geographic location information of the first terminal in Step 302. In addition, after the second terminal received the updated geographic location information sent by the first terminal, the second terminal may further update, according to the updated geographic location information of the first terminal, the current geographic location of the first terminal marked on the map interface corresponding to the first terminal. For example, the second terminal marks the current geographic location of the first terminal on the map interface corresponding to the first terminal according to the geographic location information before and after being the updated by the first terminal, as shown in FIG. 11. The location marked with a bubble may be the current geographic location of the first terminal marked by the second terminal on the map interface corresponding to the first terminal after the first terminal may send to the second terminal the geographic location information before being the updated by the first terminal, and the circled location may be the updated current geographic location of the first terminal marked by the second terminal on the map interface corresponding to the first terminal after the second terminal may receive the updated geographic location information sent by the first terminal.

The second terminal may receive the updated geographic location information of the first terminal acquired by the first terminal at an interval of the preset period of time, that is, the second terminal can acquire the geographic location information the updated in real-time by the first terminal. Therefore, the second terminal can determine, according to the current geographic location of the first terminal, time when the first terminal reaches a preset location. The preset location may be any location, which is not limited by this embodiment. When the second terminal determines, according to the current geographic location of the first terminal, time when the first terminal reaches the preset location, the present disclosure does not limit the specific determining manner. For example, after acquiring the current geographic location information of the first terminal and the preset location that the first terminal may be going to reach, the second terminal estimates, according to a distance between the current geographic location of the first terminal and the preset location, time when the first terminal reaches the preset location. The manner in which the second terminal obtains the preset location that the first terminal may be going to reach may be not limited by this embodiment. For example, the second terminal may acquire a location selected by the user on the map interface and use the location as the preset location that the first terminal may be going to reach.

Figure 12:
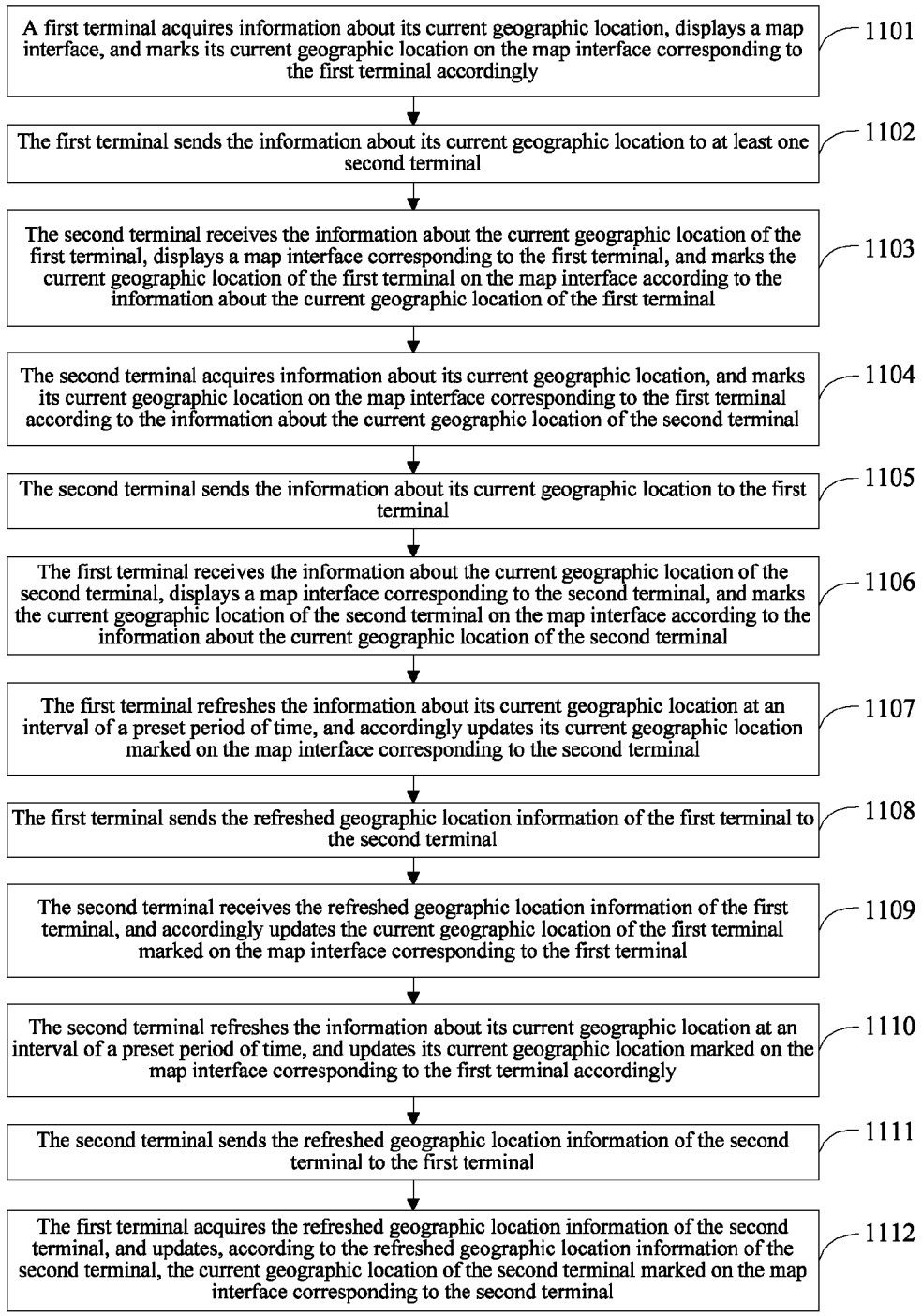
FIG. 12 is a flowchart of a method for sharing a geographic location according to the example embodiments of the present disclosure.

FIG. 12 is a flowchart of a method for sharing a geographic location according to the example embodiments of the present disclosure. The flowchart provides a method for sharing a geographic location, and the method for sharing a geographic location according to the example embodiments may be described with reference to the content of above example embodiments and by using an example wherein a first terminal and a second terminal share geographic locations with each other. The method may include the following steps:

1101: A first terminal may acquire and/or obtain information about a current geographic location of the first terminal, display a map interface, and mark the current geographic location of the first terminal on the map interface corresponding to the first terminal according to the current geographic location information of the first terminal.

The manner in which the first terminal may acquire and/or obtain the current geographic location information of the first terminal may be the same as the manner in which the first terminal may acquire and/or obtain the current geographic location information in Step 301.

The manner in which the first terminal marks the current geographic location of the first terminal on the map interface according to the current geographic location information of the first terminal may be the same as the manner in which the second terminal displays the map interface and marks the current geographic location of the first terminal on the map interface corresponding to the first terminal according to the current geographic location information of the first terminal in Step 302.

After the first terminal displays the map interface, and marks the current geographic location of the first terminal on the map interface, to avoid affecting the interaction between the second user and the first user, the method according to the example embodiments of the present disclosure may further support an information interaction process between the first terminal and the second terminal. In an implementation, the information interaction may include, but is not limited to, voice information interaction, text information interaction, picture information interaction, and video information interaction, and the specific information interaction may be not limited in this embodiment.

After marking the current geographic location on the map interface according to the current geographic location information, the first terminal may further display, at the current geographic location of the first terminal marked on the map interface, a first user profile photo. In an implementation, after the first terminal displays, at the current geographic location of the first terminal marked on the map interface, the first user profile photo, the map interface displayed by the first terminal may also be as shown in FIG. 7.

After the first terminal displays, at the current geographic location of the first terminal marked on the map interface, the first user profile photo, to make it easy for the user to check the map interface, in the method according to this embodiment, the first terminal may further support a drag action of the user on the map interface, so that the user checks the geographic location of the first terminal more easily. Therefore, after the first terminal displays, at the current geographic location of the first terminal marked on the map interface, the first user profile photo, the first terminal may further detect a drag action on the map interface, and move the map interface according to a detected drag action. For example, the map interface displayed by the first terminal may include, but is not limited to, the map interface shown in FIG. 10(1). To display information on the map interface more clearly to the user, when the first terminal detects a drag action and moves the map interface according to the drag action, the first terminal may hide the user profile photo displayed on the map interface, so as to clearly display the map interface. For example, the map interface displayed by the first terminal at this time may include, but is not limited to, the map interface shown in FIG. 10(2). Subsequently, to avoid affecting the display of the user profile photo, after a preset period of time since the end of the drag action, the first terminal may further display the hidden user profile photo on the map interface. For example, the map interface displayed by the first terminal at this time may include, but is not limited to, the map interface shown in FIG. 10(3).

1102: The first terminal may send the current geographic location information of the first terminal to at least one second terminal.

In this step, the manner in which the first terminal may send the current geographic location information of the first terminal to at least one second terminal may be the same as the manner in which the first terminal may send the current geographic location information of the first terminal to at least one second terminal in Step 301.

1103: The second terminal may receive the current geographic location information of the first terminal sent by the first terminal, display a map interface corresponding to the first terminal, and mark the current geographic location of the first terminal on the map interface corresponding to the first terminal according to the current geographic location information of the first terminal.

In this step, the manner in which the second terminal may receive the current geographic location information of the first terminal sent by the first terminal, displays a map interface corresponding to the first terminal, and marks the current geographic location of the first terminal on the map interface corresponding to the first terminal according to the current geographic location information of the first terminal may be the same as the manner in which the second terminal may receive the current geographic location information of the first terminal sent by the first terminal, displays a map interface corresponding to the first terminal, and marks the current geographic location of the first terminal on the map interface corresponding to the first terminal according to the current geographic location information of the first terminal in Step 302.

Further, after the second terminal received the current geographic location information of the first terminal sent by the first terminal, the second terminal may acquire the current geographic location of the first terminal according to the received current geographic location information of the first terminal. At this time, to clearly display the current geographic location of the first terminal to the user, the second terminal may display a map interface corresponding to the first terminal, and mark the current geographic location of the first terminal on the map interface corresponding to the first terminal. The manner in which the second terminal displays the map interface corresponding to the first terminal may be the same as the manner in which the second terminal displays the map interface corresponding to the first terminal described in Step 302.

The manner in which the second terminal marks the current geographic location of the first terminal on the map interface corresponding to the first terminal may include, but is not limited to, marking the current geographic location of the first terminal on the map interface corresponding to the first terminal with a bubble, as shown in FIG. 7. Apart from this marking manner, other marking manners may also be used, which is not limited by this embodiment.

After the second terminal displays the map interface corresponding to the first terminal, and marks the current geographic location of the first terminal on the map interface corresponding to the first terminal, to avoid affecting the interaction between the second user and the first user, the method according to this embodiment may further support an information interaction process between the second terminal and the first terminal. In an implementation, the information interaction may include, but is not limited to, voice information interaction, text information interaction, picture information interaction, and video information interaction, and the specific information interaction may be not limited in this embodiment.

After the second terminal marks the current geographic location of the first terminal on the map interface corresponding to the first terminal according to the current geographic location information of the first terminal, the second terminal may further display, at the current geographic location of the first terminal marked on the map interface corresponding to the first terminal, a first user profile photo, so as to ensure that when multiple first terminals share geographic locations with the second terminal and the geographic locations of the multiple first terminals may be displayed on the same map interface of the second terminal, the second terminal can distinguish the first users corresponding to the first terminals from each other and the geographic locations corresponding to the first terminals from each other according to the user profile photos. In an implementation, after the second terminal displays, at the current geographic location of the first terminal marked on the map interface corresponding to the first terminal, the first user profile photo, the map interface may be as shown in FIG. 8.

Further, after the second terminal displays, at the current geographic location of the first terminal marked on the map interface corresponding to the first terminal, the first user profile photo, the method according to this embodiment further may include that: the second terminal may acquire and/or obtain user information corresponding to the first terminal, and displays the user information corresponding to the first terminal after the first user profile photo may be selected. The user information corresponding to the first terminal may be user information of the first user, wherein the user information may include, but is not limited to, nickname, address, and age of the first user, and the present disclosure does not limit the specific user information. When the second terminal may acquire and/or obtain the user information corresponding to the first terminal, if the first user and the second user register for the same application program, a server corresponding to the application program may store the user information of the first user. Therefore, the second user may be connected to the server corresponding to the application program so as to request the user information of the first user from the server. Apart from this manner for acquiring the user information corresponding to the first terminal, other acquisition manners may also be used, which is not limited by this embodiment. No matter which manner may be used to acquire the user information corresponding to the first terminal, after the first user profile photo may be selected, this embodiment does limit the manner in which the second terminal displays the user information corresponding to the first terminal. The display manner may include, but is not limited to, setting and displaying other options related to the user corresponding to the first terminal, wherein the other options include, but is not limited to, an option for checking user information, and an option for navigating to the location of the user, and an interface for displaying the options may be as shown in FIG. 9. When the option for checking user information may be selected, the user information corresponding to the first terminal may be displayed. The manner for displaying the user information corresponding to the first terminal may include, but is not limited to, displaying the user information corresponding to the first terminal by using a pop-up information bar.

Further, after the second terminal displays, at the current geographic location of the first terminal marked on the map interface corresponding to the first terminal, the first user profile photo, to make it easy for the user to check the map interface corresponding to the first terminal, in the method according to this embodiment, the second terminal may further support a drag action of the user on the map interface corresponding to the first terminal, so that the user checks the geographic location of the first terminal more easily. Therefore, after the second terminal displays, at the current geographic location of the first terminal marked on the map interface corresponding to the first terminal, the first user profile photo, the second terminal may further detect a drag action on the map interface corresponding to the first terminal, and moves the map interface corresponding to the first terminal according to a detected drag action. For example, the map interface corresponding to the first terminal displayed by the second terminal may include, but is not limited to, the map interface shown in FIG. 10(1). As the map interface corresponding to the first terminal displays the first user profile photo, if multiple first terminals share the geographic locations with the second terminal and the geographic locations of the multiple first terminals may be displayed on the same map interface of the second terminal, the map interface corresponding to the first terminal displays multiple user profile photos. To display information on the map interface corresponding to the first terminal more clearly to the user, when the second terminal detects a drag action and moves the map interface corresponding to the first terminal according to the drag action, the second terminal may hide the user profile photos displayed on the map interface corresponding to the first terminal, so as to clearly display the map interface corresponding to the first terminal. For example, the map interface corresponding to the first terminal displayed by the second terminal at this time may include, but is not limited to, the map interface shown in FIG. 10(2). Subsequently, to avoid affecting the display of the user profile photo, after a preset period of time since the end of the drag action, the second terminal may further display the hidden user profile photo on the map interface corresponding to the first terminal. For example, the map interface corresponding to the first terminal displayed by the second terminal at this time may include, but is not limited to, the map interface shown in FIG. 10(3).

1104: The second terminal may acquire and/or obtain information about a current geographic location of the second terminal, and mark the current geographic location of the second terminal on the map interface corresponding to the first terminal according to the current geographic location information of the second terminal.

In this step, the present disclosure does not limit the manner in which the second terminal may acquire and/or obtain the current geographic location information of the second terminal, and the acquisition manner may be the same as the manner in which the first terminal may acquire and/or obtain the current geographic location information of the first terminal in Step 301.

Further, as the second terminal and the first terminal can share geographic locations with each other, the current geographic locations of the second terminal and the first terminal may be displayed on the same map interface, so that a distance difference between the two terminals can be checked clearly. Therefore, the second terminal may acquire and/or obtain the current geographic location information of the second terminal, and marks the current geographic location of the second terminal on the map interface corresponding to the first terminal according to the current geographic location information of the second terminal. The manner in which the second terminal marks the current geographic location of the second terminal on the map interface corresponding to the first terminal according to the current geographic location information of the second terminal may be the same as the manner in which the second terminal marks the current geographic location of the first terminal on the map interface corresponding to the first terminal according to the current geographic location information of the first terminal in Step 302 of the foregoing example embodiments.

After marking the current geographic location on the map interface corresponding to the first terminal according to the information about its current geographic location, the second terminal may further display, at the current geographic location of the second terminal marked on the map interface corresponding to the first terminal, a second user profile photo. The manner in which the second terminal displays, at the current geographic location of the second terminal marked on the map interface corresponding to the first terminal, the second user profile photo is not limited by the embodiment of the present disclosure, and in an implementation, may be the same as the manner in which the second terminal displays, at the current geographic location of the first terminal marked on the map interface corresponding to the first terminal, the first user profile photo. Refer to related description of Step 302.

It should be noted that, apart from marking the current geographic location of the second terminal on the map interface corresponding to the first terminal according to the current geographic location information of the second terminal, the second terminal may also separately display a map interface corresponding to the second terminal, and display the current geographic location of the second terminal on the map interface corresponding to the second terminal according to the current geographic location information of the second terminal. The manner for displaying the current geographic location of the second terminal is not limited by this embodiment.

1105: The second terminal may send the current geographic location information of the second terminal to the first terminal.

In this step, in order to share the geographic location with the first terminal, the second terminal needs to send the acquired geographic location information of the second terminal to the first terminal. The manner in which the second terminal may send the current geographic location information of the second terminal to the first terminal is not limited by the embodiment of the present disclosure, and in an implementation, may be the same as the manner in which the first terminal may send the current geographic location information of the first terminal to the second terminal in Step 301 in Embodiment 2, and may be not described in detail herein again.

1106: The first terminal may receive the current geographic location information of the second terminal, and mark the current geographic location of the second terminal on a map interface corresponding to the second terminal according to the current geographic location information of the second terminal.

In this step, the map interface may corresponding to the second terminal may be the same as or different from the map interface displaying the geographic location of the first terminal, and map interfaces corresponding to different second terminals may be the same or different, which is not limited in this embodiment.

The manner in which the first terminal marks the current geographic location of the second terminal on the map interface corresponding to the second terminal according to the current geographic location information of the second terminal may be the same as the manner in which the second terminal marks the current geographic location of the first terminal on the map interface corresponding to the first terminal according to the current geographic location information of the first terminal in Step 302.

After the first terminal marks the current geographic location of the second terminal on the map interface corresponding to the second terminal according to the current geographic location information of the second terminal, the first terminal may further display, at the current geographic location of the second terminal marked on the map interface corresponding to the second terminal, a second user profile photo, so as to ensure that when multiple second terminals share geographic locations with the first terminal and the first terminal displays the current geographic locations of all the second terminals on the same map interface, the first terminal can distinguish the second users corresponding to the second terminals from each other and the geographic locations corresponding to the second terminals from each other according to the user profile photos. In an implementation, after the first terminal displays, at the current geographic location of the second terminal marked on the map interface, the second user profile photo, the map interface may be as shown in FIG. 8.

After the first terminal displays, at the current geographic location of the second terminal marked on the map interface corresponding to the second terminal, the second user profile photo, the method according to this embodiment further may include that: the first terminal may acquire and/or obtain user information corresponding to the second terminal, and displays the user information corresponding to the second terminal after the second user profile photo may be selected. The user information corresponding to the second terminal may be user information of the second user, wherein the user information may include, but is not limited to, nickname, address, and age of the second user, and the present disclosure does not limit the specific user information. When the first terminal may acquire and/or obtain the user information corresponding to the second terminal, if the second user and the first user register for the same application program, a server corresponding to the application program may store the user information of the second user. Therefore, the first user may be connected to the server corresponding to the application program so as to request the user information of the second user from the server. Apart from this manner for acquiring the user information corresponding to the second terminal, other acquisition manners may also be used, which is not limited by this embodiment. No matter which manner may be used to acquire the user information corresponding to the second terminal, after the second user profile photo and displayed on the map interface corresponding to the second terminal may be selected, this embodiment does limit the manner in which the first terminal displays the user information corresponding to the second terminal. The display manner may include, but is not limited to, setting and displaying other options related to the user corresponding to the second terminal, wherein the other options include, but is not limited to, an option for checking user information, and an option for navigating to the location of the user, and an interface for displaying the options may be displayed as shown in FIG. 9. When the option for checking user information may be selected, the user information corresponding to the second terminal may be displayed. The manner for displaying the user information corresponding to the second terminal may include, but is not limited to, displaying the user information corresponding to the second terminal by using a pop-up information bar.

1107: The first terminal may refresh and/or update the current geographic location information of the first terminal at an interval of a preset period of time, and update, according to the updated geographic location information of the first terminal, the current geographic location of the first terminal marked on the map interface corresponding to the second terminal.

In this step, the manner in which the first terminal may refresh and/or update the current geographic location information of the first terminal at an interval of a preset period of time may be the same as the manner in which the first terminal may refresh and/or update the current geographic location information of the first terminal at an interval of a preset period of time in Step 303.

Further, the manner for updating, according to the updated geographic location information of the first terminal, the current geographic location of the first terminal marked on the map interface may be the same as the manner in which the second terminal updates, according to the current geographic location information of the first terminal, the current geographic location of the first terminal marked on the map interface corresponding to the first terminal in Step 302.

1108: The first terminal may send the updated geographic location information of the first terminal to the second terminal.

In this step, in order to share the geographic location with the second terminal in real-time, the first terminal needs to send the updated geographic location information to the second terminal. The manner in which the first terminal may send the updated geographic location information to the second terminal is not limited by the embodiment of the present disclosure. In an implementation, the sending manner may be the same as the manner in which the first terminal may send the current geographic location information to the second terminal in Step 301.

1109: The second terminal may receive the updated geographic location information of the first terminal sent by the first terminal, and update, according to the updated geographic location information of the first terminal, the current geographic location of the first terminal marked on the map interface corresponding to the first terminal.

In this step, the manner in which the second terminal may receive the updated geographic location information of the first terminal sent by the first terminal and the manner in which the second terminal updates, according to the updated geographic location information of the first terminal, the current geographic location of the first terminal marked on the map interface corresponding to the first terminal may be not limited by the embodiment of the present disclosure. In an implementation, reference may be made to related content of Step 304.

The second terminal may receive the updated geographic location information of the first terminal acquired by the first terminal at an interval of the preset period of time, that is, the second terminal can acquire the geographic location information the updated in real-time by the first terminal. Therefore, the second terminal can determine, according to the current geographic location of the first terminal, time when the first terminal reaches a preset location. The preset location may be any location, which is not limited by this embodiment. When the second terminal determines, according to the current geographic location of the first terminal, time when the first terminal reaches the preset location, the present disclosure does not limit the specific determining manner. For example, after acquiring the current geographic location information of the first terminal and the preset location that the first terminal may be going to reach, the second terminal estimates, according to a distance between the current geographic location of the first terminal and the preset location, time when the first terminal reaches the preset location. The manner in which the second terminal obtains the preset location that the first terminal may be going to reach may be not limited by this embodiment. For example, the second terminal may acquire a location selected by the user on the map interface and uses the location as the preset location that the first terminal may be going to reach.

1110: The second terminal may refresh and/or update the current geographic location information of the second terminal at an interval of a preset period of time, and update, according to the updated geographic location information of the second terminal, the current geographic location of the second terminal marked on the map interface corresponding to the first terminal.

In this step, the geographic location of the second terminal may also change at any time, and therefore, when sharing the geographic location with the first terminal, the second terminal also needs to refresh the information about its current geographic location at an interval of the preset period of time, so as to ensure that the first terminal can obtain the real-time geographic location of the second terminal. In addition, each time the second terminal may refresh and/or update its geographic location information, the second terminal needs to update, according to the updated geographic location information, the current geographic location of the second terminal marked on the map interface corresponding to the first terminal, so that the user confirms, on the map interface corresponding to the first terminal, a relationship between the current geographic location of the second terminal and the current geographic location of the first terminal. The manner in which the second terminal may refresh and/or update the current geographic location information of the second terminal at an interval of a preset period of time, the preset period of time serving as an interval for refreshing and/or updating the geographic location information, and manner in which the second terminal updates, according to the updated geographic location information of the second terminal, the current geographic location of the second terminal marked on the map interface corresponding to the first terminal is not limited by the embodiment of the present disclosure. In an implementation, reference may be made to related content of Step 303 and Step 304.

1111: The second terminal may send the updated geographic location information of the second terminal to the first terminal.

In this step, in order to share the geographic location with the first terminal in real-time, the second terminal needs to send the updated geographic location information to the first terminal. The manner in which the second terminal may send the updated geographic location information to the first terminal is not limited by the embodiment of the present disclosure. In an implementation, reference may be made to the manner in which the first terminal may send the updated geographic location information of the first terminal to the second terminal in Step 303.

1112: The first terminal may acquire and/or obtain the updated geographic location information of the second terminal, and update, according to the updated geographic location information of the second terminal, the current geographic location of the second terminal marked on the map interface corresponding to the second terminal.

In this step, in order to track the real-time geographic location of the second terminal in real-time, the first terminal needs to acquire the updated geographic location information of the second terminal in real-time. In addition, in order to confirm a movement situation or location change situation of the second terminal, the first terminal may update, according to the updated geographic location information of the second terminal, the current geographic location of the second terminal marked on the map interface corresponding to the second terminal. The manner in which the first terminal may acquire and/or obtain the updated geographic location information of the second terminal and the manner in which the first terminal updates, according to the updated geographic location information of the second terminal, the current geographic location of the second terminal marked on the map interface corresponding to the second terminal is not limited by the embodiment of the present disclosure, and in an implementation, reference may be made to related content of Step 304.

The first terminal may receive the updated geographic location information of the second terminal acquired by the second terminal at an interval of the preset period of time, that is, the first terminal can acquire the geographic location information the updated in real-time by the second terminal. Therefore, the first terminal can determine, according to the current geographic location of the second terminal, time when the second terminal reaches a preset location. The preset location may be any location, which is not limited by this embodiment. When the first terminal determines, according to the current geographic location of the second terminal, time when the second terminal reaches the preset location, the present disclosure does not limit the specific determining manner. For example, after acquiring the current geographic location information of the second terminal and the preset location that the second terminal may be going to reach, the first terminal estimates, according to a distance between the current geographic location of the second terminal and the preset location, time when the second terminal reaches the preset location. The manner in which the first terminal obtains the preset location that the second terminal may be going to reach may be not limited by this embodiment. For example, the first terminal may acquire a location selected by the user on the map interface and uses the location as the preset location that the second terminal may be going to reach.

In the method according to the example embodiments of the present disclosure, the first terminal may send the current geographic location information of the first terminal to at least one second terminal, and after refreshing and/or updating the information about its current geographic location at an interval of a preset period of time, may send the updated geographic location information to the second terminal, thereby sharing a dynamic geographic location with the second terminal in real-time, so that the shared geographic location information may be more valuable for reference, and therefore, a second user corresponding to the second terminal can position a first user corresponding to the first terminal according to the updated geographic location information of the first terminal more accurately.

Figure 13:
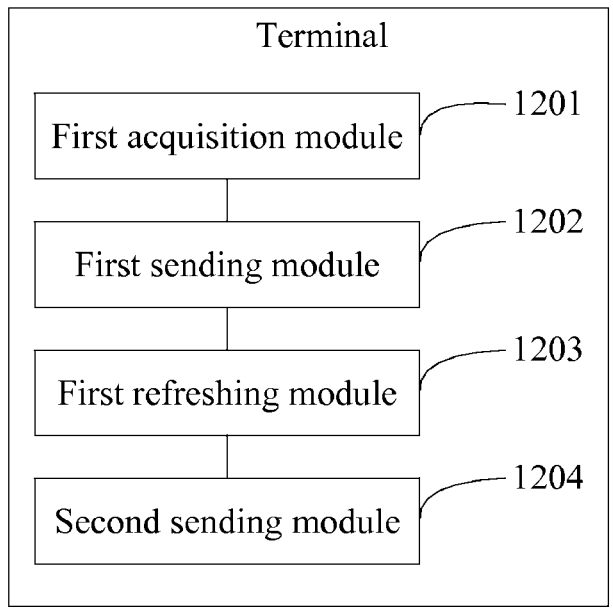
FIG. 13 is a schematic structural diagram of a terminal according to the example embodiments of the present disclosure.

FIG. 13 is a schematic structural diagram of a terminal according to the example embodiments of the present disclosure. Based on the structure of terminal 1600, the terminal may include a first acquisition module 1201, configured to acquire information about a current geographic location of the terminal; a first sending module 1202, configured to send the current geographic location information of the terminal to a second terminal; a first refreshing module 1203, configured to refresh and/or update the current geographic location information of the terminal at an interval of a preset period of time; and a second sending module 1204, configured to send the updated geographic location information of the terminal to the second terminal, wherein at least one second terminal may be provided.

The first sending module 1202 may be configured to send the current geographic location information of the first terminal to a server, so that the server may forward the current geographic location information of the first terminal to the second terminal; and the second sending module 1204 may be configured to send the updated geographic location information of the first terminal to the server, so that the server may forward the updated geographic location information of the first terminal to the second terminal.

The terminal may further include: a first display module, configured to display a map interface; a first marking module, configured to mark the current geographic location of the terminal on the map interface according to the current geographic location information of the terminal; and a first update module, configured to update, according to the updated geographic location information of the terminal, the current geographic location of the terminal marked on the map interface.

The terminal further may include: a second display module, configured to display, at the current geographic location of the terminal marked on the map interface, a user profile photo corresponding to the terminal.

The first display module may be configured to display one map interface, wherein the one map interface corresponds to all second terminals. The first display module may also be configured to display map interfaces whose quantity may be the same as that of second terminals, wherein each map interface corresponds to one second terminal.

The terminal may further include: a second acquisition module, configured to acquire information about a current geographic location of the second terminal; and a second marking module, configured to mark the current geographic location of the second terminal on a map interface corresponding to the second terminal according to the current geographic location information of the second terminal.

The second acquisition module may be configured to receive the current geographic location information of the second terminal forwarded by the server.

The terminal may further include: a third acquisition module, configured to acquire the updated geographic location information of the second terminal; and a second update module, configured to update, according to the updated geographic location information of the second terminal, the current geographic location of the second terminal marked on the map interface corresponding to the second terminal.

The third acquisition module may be configured to receive the updated geographic location information of the second terminal forwarded by the server.

The terminal may further include: a third display module, configured to display, at the current geographic location of the second terminal marked on the map interface corresponding to the second terminal, a second user profile photo.

The terminal may further include: a fourth acquisition module, configured to acquire user information corresponding to the second terminal; and a fourth display module, configured to display the user information corresponding to the second terminal after the second user profile photo may be selected.

The terminal may further include: a first detection module, configured to detect a drag action on the map interface; a first movement module, configured to move the map interface according to a detected drag action; and a first hiding module, configured to hide the user profile photo displayed on the map interface, and after a preset period of time since the end of the drag action, display the hidden user profile photo on the map interface.

The terminal may further include: a first interaction module, configured to perform information interaction with the second terminal, wherein the information interaction at least may include one of voice information interaction, text information interaction, picture information interaction, and video information interaction.

The terminal may further include: a first determining module, configured to determine, according to the current geographic location of the second terminal, time when the second terminal reaches a preset location.

Figure 14:
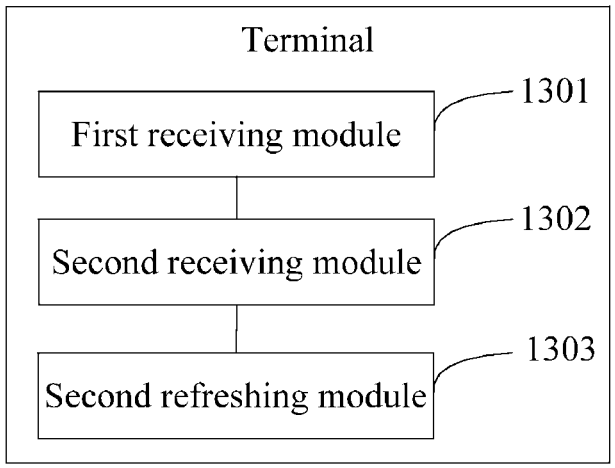
FIG. 14 is a schematic structural diagram of a terminal according to the example embodiments of the present disclosure.

FIG. 14 is a schematic structural diagram of a terminal according to the example embodiments of the present disclosure. Based on a structure of the terminal 1600, the terminal may include: a first receiving module 1301, configured to receive information about a current geographic location of a first terminal sent by the first terminal; a second receiving module 1302, configured to receive the updated geographic location information of the first terminal sent by the first terminal; and a second refreshing and/or updating module 1303, used for refreshing and/or updating the current geographic location of the first terminal according to the updated geographic location information of the first terminal.

The first receiving module 1301 may be configured to receive the current geographic location information of the first terminal forwarded by a server; and the second receiving module 1302 may be configured to receive the updated geographic location information of the first terminal forwarded by the server.

The terminal may further include: a fifth display module, configured to display a map interface corresponding to the first terminal; a third marking module, configured to mark the current geographic location of the first terminal on the map interface corresponding to the first terminal according to the current geographic location information of the first terminal; and a third update module, configured to update, according to the updated geographic location information of the first terminal, the current geographic location of the first terminal marked on the map interface corresponding to the first terminal.

The terminal may further include: a sixth display module, configured to display, at the current geographic location of the first terminal marked on the map interface corresponding to the first terminal, a first user profile photo.

The fifth display module may be configured to display one map interface, wherein the one map interface corresponds to all first terminals. The fifth display module may also be configured to display map interfaces whose quantity may be the same as that of first terminals, wherein each map interface corresponds to one first terminal.

The terminal may further include: a fifth acquisition module, configured to acquire information about a current geographic location of the terminal; and a third sending module, configured to send the current geographic location information of the terminal to the first terminal.

The third sending module may be configured to send the current geographic location information of the terminal to a server, so that the server may forward the current geographic location information of the terminal to the first terminal.

The terminal may further include: a fourth marking module, configured to mark the current geographic location of the terminal on the map interface corresponding to the first terminal according to the current geographic location information of the terminal.

The terminal may further include: a third refreshing and/or updating module, configured to refresh and/or update the current geographic location information of the terminal at an interval of a preset period of time; and a fourth sending module, configured to send the updated geographic location information of the terminal to the first terminal.

The fourth sending module may be configured to send the updated geographic location information of the terminal to the server, so that the server forwards the updated geographic location information of the terminal to the first terminal.

The terminal may further include: a fourth update module, configured to update, according to the updated geographic location information of the terminal, the current geographic location of the terminal marked on the map interface corresponding to the first terminal.

The terminal may further include: a seventh display module, configured to display, at the current geographic location of the terminal marked on the map interface corresponding to the first terminal, a user profile photo corresponding to the terminal.

The terminal may further include: a sixth acquisition module, configured to acquire user information corresponding to the first terminal; and an eighth display module, configured to display the user information corresponding to the first terminal after the first user profile photo may be selected.

The terminal may further include: a second detection module, configured to detect a drag action on the map interface corresponding to the first terminal; and a second movement module, configured to move the map interface according to a detected drag action; and a second hiding module, configured to hide the user profile photo displayed on the map interface corresponding to the first terminal, and after a preset period of time since the end of the drag action, display the hidden user profile photo on the map interface corresponding to the first terminal.

The terminal may further include: a second interaction module, configured to perform information interaction with the first terminal, wherein the information interaction at least may include one of voice information interaction, text information interaction, picture information interaction, and video information interaction.

The terminal may further include: a second determining module, configured to determine, according to the current geographic location of the first terminal, time when the first terminal reaches a preset location.

Figure 15:
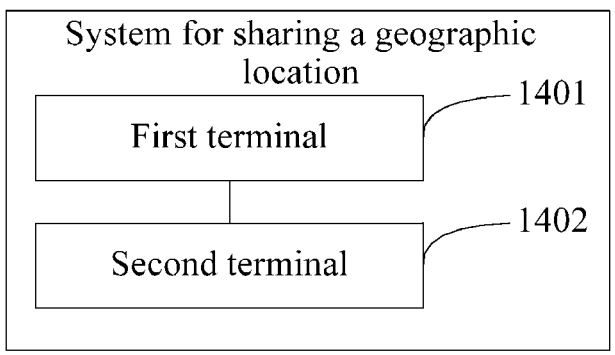
FIG. 15 is a schematic structural diagram of a system for sharing a geographic location according to the example embodiments of the present disclosure.

FIG. 15 is a schematic structural diagram of a system for sharing a geographic location according to the example embodiments of the present disclosure. The system may include a first terminal 1401 and a second terminal 1402. For example, the first terminal 1401 may be the terminal according to FIG. 13, and the second terminal 1402 may be the terminal according to FIG. 14.

Referring back to FIG. 16, the terminal 1600 may serve as a first terminal and be configured to implement the method for sharing a geographic location according to the foregoing example embodiments. By executing the one or more programs and/or instructions stored in the memory, the processor is configured to perform operations including:

Acquiring information about a current geographic location of the first terminal, and sending the current geographic location information of the first terminal to a second terminal; and refreshing and/or updating the current geographic location information of the first terminal at an interval of a preset period of time, and sending the updated geographic location information of the first terminal to the second terminal, wherein at least one second terminal may be provided.

Sending the current geographic location information of the first terminal to a server, and the server forwards the current geographic location information of the first terminal to the second terminal.

The step of sending the updated geographic location information of the first terminal to the second terminal may include: sending the updated geographic location information of the first terminal to the server, and the server forwards the updated geographic location information of the first terminal to the second terminal.

Displaying a map interface, and marking the current geographic location of the first terminal on the map interface according to the current geographic location information of the first terminal; and after the first terminal refreshes and/or updates the current geographic location information of the first terminal at an interval of the preset period of time, the performance further may include: updating, according to the updated geographic location information of the first terminal, the current geographic location of the first terminal marked on the map interface.

After the step of marking the current geographic location of the first terminal on the map interface according to the current geographic location information of the first terminal, the operations may further include: displaying, at the current geographic location of the first terminal marked on the map interface, a first user profile photo.

The operations of displaying a map interface may include: displaying one map interface, wherein the one map interface corresponds to all second terminals.

The operations of displaying a map interface may include: displaying map interfaces whose quantity may be the same as that of second terminals, wherein each map interface corresponds to one second terminal.

The operations may further include sending the current geographic location information of the first terminal to the second terminal, and acquiring information about a current geographic location of the second terminal, and marking the current geographic location of the second terminal on a map interface corresponding to the second terminal according to the current geographic location information of the second terminal.

The operations may further include acquiring information about a current geographic location of the second terminal, which may include: receiving the current geographic location information of the second terminal forwarded by the server.

After the step of acquiring information about a current geographic location of the second terminal, the operations may further include: acquiring the updated geographic location information of the second terminal, and updating, according to the updated geographic location information of the second terminal, the current geographic location of the second terminal marked on the map interface corresponding to the second terminal.

The operations of acquiring the updated geographic location information of the second terminal may include: receiving the updated geographic location information of the second terminal forwarded by the server.

After the step of marking the current geographic location of the second terminal on a map interface corresponding to the second terminal according to the current geographic location information of the second terminal, the operations may further include: displaying, at the current geographic location of the second terminal marked on the map interface corresponding to the second terminal, a second user profile photo.

After the step of displaying, at the current geographic location of the second terminal marked on the map interface corresponding to the second terminal, a second user profile photo, the operations may further include: acquiring user information corresponding to the second terminal, and displaying the user information corresponding to the second terminal after the second user profile photo and displayed on the map interface may be selected.

After the step of displaying, at the current geographic location of the first terminal marked on the map interface, a first user profile photo, the operations may further include: detecting a drag action on the map interface; and moving the map interface according to a detected drag action, hiding the user profile photo displayed on the map interface, and after a preset period of time since the end of the drag action, displaying the hidden user profile photo on the map interface.

After the step of displaying a map interface, the operations may further include: performing information interaction with the second terminal, wherein the information interaction at least may include one of voice information interaction, text information interaction, picture information interaction, and video information interaction.

After the step of acquiring the updated geographic information of the second terminal, the operations may further include: determining, according to the current geographic location of the second terminal, time when the second terminal reaches a preset location.

The example embodiments of the present disclosure may further provide a non-transitory computer readable storage medium, wherein the computer storage medium may be the computer readable storage medium included in the memory in the foregoing example embodiment, and may also be a separate computer readable storage medium not assembled in the terminal. The computer readable storage medium stores one or more programs or sets of instructions, wherein the one or more programs and/or instructions may be executed by one or more processors of a first terminal to perform operations of:

Acquiring information about a current geographic location of the first terminal, and sending the current geographic location information of the first terminal to a second terminal; and refreshing and/or updating the current geographic location information of the first terminal at an interval of a preset period of time, and sending the updated geographic location information of the first terminal to the second terminal, wherein at least one second terminal may be provided.

The operations of sending the current geographic location information of the first terminal to a second terminal may include: sending the current geographic location information of the first terminal to a server, and the server forwarding the current geographic location information of the first terminal to the second terminal.

The operations of sending the updated geographic location information of the first terminal to the second terminal may include: sending the updated geographic location information of the first terminal to the server, and the server forwarding the updated geographic location information of the first terminal to the second terminal.

After the first terminal may acquire and/or obtain the current geographic location information of the first terminal, the operations may further include: displaying a map interface, and marking the current geographic location of the first terminal on the map interface according to the current geographic location information of the first terminal; and After the first terminal may refresh and/or update the current geographic location information of the first terminal at an interval of the preset period of time, the operations may further include: updating, according to the updated geographic location information of the first terminal, the current geographic location of the first terminal marked on the map interface.

After the step of marking the current geographic location of the first terminal on the map interface according to the current geographic location information of the first terminal, the operations may further include: displaying, at the current geographic location of the first terminal marked on the map interface, a first user profile photo.

The operations of displaying a map interface may include: displaying one map interface, wherein the one map interface corresponds to all second terminals, or alternatively, displaying map interfaces whose quantity may be the same as that of second terminals, wherein each map interface corresponds to one second terminal.

After sending the current geographic location information of the first terminal to at least one second terminal, the operations may further include: acquiring information about a current geographic location of the second terminal, and marking the current geographic location of the second terminal on a map interface corresponding to the second terminal according to the current geographic location information of the second terminal.

The operations of acquiring information about a current geographic location of the second terminal may include: receiving the current geographic location information of the second terminal forwarded by the server.

After acquiring information about a current geographic location of the second terminal, the operations may further include: acquiring the updated geographic location information of the second terminal, and updating, according to the updated geographic location information of the second terminal, the current geographic location of the second terminal marked on the map interface corresponding to the second terminal.

The operation of acquiring information about a current geographic location of the second terminal may include: receiving the updated geographic location information of the second terminal forwarded by the server.

After marking the current geographic location of the second terminal on a map interface corresponding to the second terminal according to the current geographic location information of the second terminal, the operations may further include: displaying, at the current geographic location of the second terminal marked on the map interface corresponding to the second terminal, a second user profile photo.

After the displaying, at the current geographic location of the second terminal marked on the map interface corresponding to the second terminal, a second user profile photo, the operations may further include: acquiring user information corresponding to the second terminal, and displaying the user information corresponding to the second terminal after the second user profile photo and displayed on the map interface may be selected.

The operations may further include: detecting a drag action on the map interface; and moving the map interface according to a detected drag action, hiding the user profile photo displayed on the map interface, and after a preset period of time since the end of the drag action, displaying the hidden user profile photo on the map interface.

After displaying a map interface, the operations may further include: performing information interaction with the second terminal, wherein the information interaction at least may include one of voice information interaction, text information interaction, picture information interaction, and video information interaction.

After acquiring information about a current geographic location of the second terminal, the operations may further include: determining, according to the current geographic location of the second terminal, time when the second terminal reaches a preset location.

The example embodiments of the present disclosure may provide a graphic user interface, wherein the graphic user interface may be used on a terminal, and the terminal may include a touch screen display, a memory, and one or more processors used for executing one or more programs. The graphic user interface may be configured to allow: a first terminal to acquire information about a current geographic location of the first terminal, and send the current geographic location information of the first terminal to a second terminal; and to refresh and/or update the current geographic location information of the first terminal at an interval of a preset period of time, and send the updated geographic location information of the first terminal to the second terminal, wherein at least one second terminal may be provided.

To sum up, in the user graphic interface according to the example embodiments of the present disclosure, the terminal may send the current geographic location information to at least one second terminal, and after refreshing and/or updating the information about its current geographic location at an interval of a preset period of time, may send the updated geographic location information to the second terminal, thereby sharing a dynamic geographic location with the second terminal in real-time, so that the shared geographic location information may be more valuable for reference, and therefore, a second user corresponding to the second terminal can position a first user corresponding to the terminal according to the updated geographic location information of the first terminal more accurately.

Referring back to FIG. 16, the terminal 1600 may also serve as the second terminal and be configured to implement the method for sharing a geographic location according to the foregoing example embodiments. By executing the one or more programs and/or instructions stored in the memory, the processor of the second terminal is configured to perform operations including: receiving information about a current geographic location of a first terminal sent by the first terminal; and receiving the updated geographic location information of the first terminal sent by the first terminal, and refreshing and/or updating the current geographic location of the first terminal according to the updated geographic location information of the first terminal, wherein at least one first terminal may be provided.

The receiving information about a current geographic location of a first terminal sent by the first terminal may include: receiving the current geographic location information of the first terminal forwarded by a server; and the receiving the updated geographic location information of the first terminal sent by the first terminal may include: receiving the updated geographic location information of the first terminal forwarded by the server.

After receiving information about the current geographic location of a first terminal sent by the first terminal, the operations may further include: displaying a map interface corresponding to the first terminal, and marking the current geographic location of the first terminal on the map interface corresponding to the first terminal according to the current geographic location information of the first terminal.

After receiving the updated geographic location information of the first terminal sent by the first terminal, the operations may further include: updating, according to the updated geographic location information of the first terminal, the current geographic location of the first terminal marked on the map interface corresponding to the first terminal.

After marking the current geographic location of the first terminal on the map interface corresponding to the first terminal according to the current geographic location information of the first terminal, the operations may further include: displaying, at the current geographic location of the first terminal marked on the map interface corresponding to the first terminal, a first user profile photo.

The displaying a map interface corresponding to the first terminal may include: displaying one map interface, wherein the one map interface corresponds to all first terminals.

The displaying a map interface corresponding to the first terminal may include: displaying map interfaces whose quantity may be the same as that of first terminals, wherein each map interface corresponds to one first terminal.

After receiving information about a current geographic location of a first terminal sent by the first terminal, the operations may further include: acquiring information about a current geographic location of a second terminal, and sending the current geographic location information of the second terminal to the first terminal.

The sending the current geographic location information of the second terminal to the first terminal may include: sending the current geographic location information of the second terminal to the server, and the server forwarding the current geographic location information of the second terminal to the first terminal.

After acquiring information about a current geographic location of a second terminal, the operations may further include: marking the current geographic location of the second terminal on the map interface corresponding to the first terminal according to the current geographic location information of the second terminal.

After acquiring information about a current geographic location of a second terminal, the operations may further include: refreshing and/or updating the current geographic location information of the second terminal at an interval of a preset period of time, and sending the updated geographic location information of the second terminal to the first terminal.

The sending the updated geographic location information of the second terminal to the first terminal may include: sending the updated geographic location information of the second terminal to the server, and the server forwarding the updated geographic location information of the second terminal to the first terminal.

After refreshing and/or updating the current geographic location information of the second terminal at an interval of a preset period of time, the operations may further include: updating, according to the updated geographic location information of the second terminal, the current geographic location of the second terminal marked on the map interface corresponding to the first terminal.

After marking the current geographic location of the second terminal on the map interface corresponding to the first terminal according to the current geographic location information of the second terminal, the operations may further include: displaying, at the current geographic location of the second terminal marked on the map interface corresponding to the first terminal, a second user profile photo.

After displaying, at the current geographic location of the first terminal marked on the map interface corresponding to the first terminal, a first user profile photo, the operations may further include: acquiring user information corresponding to the first terminal, and displaying the user information corresponding to the first terminal after the first user profile photo may be selected.

After displaying, at the current geographic location of the first terminal marked on the map interface, a first user profile photo, the operations may further include: detecting a drag action on the map interface corresponding to the first terminal; and moving the map interface corresponding to the first terminal according to a detected drag action, hiding the user profile photo displayed on the map interface corresponding to the first terminal, and after a preset period of time since the end of the drag action, displaying the hidden user profile photo on the map interface corresponding to the first terminal.

After displaying a map interface corresponding to the first terminal, the method further may include: performing information interaction with the first terminal, wherein the information interaction at least may include one of voice information interaction, text information interaction, picture information interaction, and video information interaction.

After refreshing and/or updating the current geographic location of the first terminal according to the updated geographic location information of the first terminal, the method further may include: determining, according to the current geographic location of the first terminal, time when the first terminal reaches a preset location.

The example embodiments of the present disclosure may further provide a computer readable storage medium, wherein the computer storage medium may be the computer readable storage medium included in the memory in the foregoing example embodiments, and may also be a separate computer readable storage medium that may be not assembled in the terminal. The computer readable storage medium stores one or more programs, wherein the one or more programs may be executed by one or more processors of the second terminal to perform the following operations:

Receiving information about a current geographic location of a first terminal sent by the first terminal; and receiving the updated geographic location information of the first terminal sent by the first terminal, and refreshing and/or updating the current geographic location of the first terminal according to the updated geographic location information of the first terminal, wherein at least one first terminal may be provided.

The receiving information about a current geographic location of a first terminal sent by the first terminal may include: receiving the current geographic location information of the first terminal forwarded by a server; and The receiving the updated geographic location information of the first terminal sent by the first terminal may include: receiving the updated geographic location information of the first terminal forwarded by the server.

After receiving information about a current geographic location of a first terminal sent by the first terminal, the operations may further include: displaying a map interface corresponding to the first terminal, and marking the current geographic location of the first terminal on the map interface corresponding to the first terminal according to the current geographic location information of the first terminal.

After receiving the updated geographic location information of the first terminal sent by the first terminal, the operations may further include: updating, according to the updated geographic location information of the first terminal, the current geographic location of the first terminal marked on the map interface corresponding to the first terminal.

After marking the current geographic location of the first terminal on the map interface corresponding to the first terminal according to the current geographic location information of the first terminal, the operations may further include: displaying, at the current geographic location of the first terminal marked on the map interface corresponding to the first terminal, a first user profile photo.

The displaying a map interface corresponding to the first terminal may include: displaying one map interface, wherein the one map interface corresponds to all first terminals.

The displaying a map interface corresponding to the first terminal may include: displaying map interfaces whose quantity may be the same as that of first terminals, wherein each map interface corresponds to one first terminal.

After receiving information about a current geographic location of a first terminal sent by the first terminal, the method further may include: acquiring information about a current geographic location of a second terminal, and sending the current geographic location information of the second terminal to the first terminal.

The sending the current geographic location information of the second terminal to the first terminal may include: sending the current geographic location information of the second terminal to the server, and the server forwarding the current geographic location information of the second terminal to the first terminal.

After acquiring information about a current geographic location of a second terminal, the operations may further include: marking the current geographic location of the second terminal on the map interface corresponding to the first terminal according to the current geographic location information of the second terminal.

After acquiring information about a current geographic location of a second terminal, the operations may further include: refreshing and/or updating the current geographic location information of the second terminal at an interval of a preset period of time, and sending the updated geographic location information of the second terminal to the first terminal.

The sending the updated geographic location information of the second terminal to the first terminal may include: sending the updated geographic location information of the second terminal to the server, and the server forwarding the updated geographic location information of the second terminal to the first terminal.

After refreshing and/or updating the current geographic location information of the second terminal at an interval of a preset period of time, the operations may further include: updating, according to the updated geographic location information of the second terminal, the current geographic location of the second terminal marked on the map interface corresponding to the first terminal.

After marking the current geographic location of the second terminal on the map interface corresponding to the first terminal according to the current geographic location information of the second terminal, the operations may further include: displaying, at the current geographic location of the second terminal marked on the map interface corresponding to the first terminal, a second user profile photo.

After displaying, at the current geographic location of the first terminal marked on the map interface corresponding to the first terminal, a first user profile photo, the operations may further include: acquiring user information corresponding to the first terminal, and displaying the user information corresponding to the first terminal after the first user profile photo and displayed on the map interface may be selected.

After displaying, at the current geographic location of the first terminal marked on the map interface, a first user profile photo, the operations may further include: detecting a drag action on the map interface corresponding to the first terminal; and moving the map interface corresponding to the first terminal according to a detected drag action, hiding the user profile photo displayed on the map interface corresponding to the first terminal, and after a preset period of time since the end of the drag action, displaying the hidden user profile photo on the map interface corresponding to the first terminal.

After displaying a map interface corresponding to the first terminal, the method operations may further include: performing information interaction with the first terminal, wherein the information interaction at least may include one of voice information interaction, text information interaction, picture information interaction, and video information interaction.

After refreshing and/or updating the current geographic location of the first terminal according to the updated geographic location information of the first terminal, the operations may further include: determining, according to the current geographic location of the first terminal, time when the first terminal reaches a preset location.

The example embodiment of the present disclosure may also provide a graphic user interface, wherein the graphic user interface may be used on a terminal, and the terminal may include a touch screen display, a memory, and one or more processors used for executing one or more programs. The graphic user interface may be configured to enable a second terminal to receive information about a current geographic location of a first terminal sent by the first terminal; and receive the updated geographic location information of the first terminal sent by the first terminal, and refresh and/or update the current geographic location of the first terminal according to the updated geographic location information of the first terminal, wherein at least one first terminal may be provided.

Accordingly, the present disclosure provides a system for sharing geographic locations between a first terminal and a second terminal, wherein the first terminal may be one or more terminals and the second terminal may be one or more terminals. With or without a server as a medium to carry communication information between the first terminal and the second terminal, the first terminal may determine its geographic location periodically, and send its geographic location to the second terminal. The first terminal may also periodically receive the geographic location for the second terminal. Additionally, the first terminal may display the geographic location of itself and/or the second terminal on a map, so that the locations of itself and/or the second terminal may be dynamically displayed on the map in real-time. Further, the first terminal may distinguish the geographic locations of itself and the second terminals with balloons of different color and display profile photo and/or information of the user of the second terminal. The second terminal, at the same time, may operate one or more operations similar to the first terminal, so that the communications between the first and second terminals may be reciprocal. Because the first and second terminals may both periodically update and send their respective geographic locations to each other and receive and display the other party's geographic locations periodically, the shared geographic location information of the first terminal and/or second terminal may be more valuable to serve as references because it is real-time and more accurate than static geographic location sharing.

It should be noted that, when the first terminal and the second terminal provided in the foregoing example embodiments share geographic locations, the division of the functional modules are merely used as an example for description. During actual applications, the foregoing functions may be completed by different functional modules, that is, the internal structure of the terminal may be divided into different functional modules to complete all or some functions described above.

Persons of ordinary skill in the art may understand that all or a part of the steps of the foregoing example embodiments may be implemented through hardware, or may be implemented by a program instructing relevant hardware. The program may be stored in a computer readable storage medium. The storage medium may be a read-only memory, a magnetic disk, or an optical disc.

Thus, example embodiments illustrated in FIGS. 1-17 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

What is claimed is:

1. A terminal, comprising:
   a processor-readable storage medium including a set of instructions of an instant communication social networking application for sharing geographic location information between the terminal and a target terminal; and
   a processor in communication with the storage medium, wherein when executing the set of instructions of the instant communication social networking application, the processor is directed to:
      acquire a current geographic location of the terminal at a preset interval of time from a positioning application installed in the terminal;
      receive a tracking instruction from an interface of an instant communication social networking application to track a target terminal;
      receive, in response to the tracking instruction, a geographic location information update of the target terminal indicative of a current geographic location of the target terminal;
      determine, in response to the geographic location information update of the target terminal, a change of the current geographic location of the target terminal;
      determine an updated travel path between the current geographic location of the terminal and the current geographic location of the target terminal in response to the change in the current geographic location of the target terminal; and
      display, on a map interface of the instant communication social networking application, the updated travel path.

2. The terminal according to claim 1, wherein the processor is further configured to execute the set of instructions to:
   repeatedly acquire a geographic location information update of the terminal at the first preset interval of time, the geographic location information update of the terminal indicative of the current geographic location of the terminal;
   determine the updated travel path between the current geographic location of the terminal and the current geographic location of the target terminal in response to the geographic location information update of the terminal; and
   display, on the map interface of the instant communication social networking application, the updated travel path in response to the geographic location information update of the terminal.

3. The terminal according to claim 2, wherein the processor is further configured to execute the set of instructions to:
   display a profile photo of a profile associated with the instant communication social networking application at the current geographic location of the terminal on the map interface.

4. The terminal according to claim 3, wherein the processor is further configured to execute the set of instructions to:
   detect a drag action executed on the map interface;
   move the map according to the drag action;
   hide the profile photo displayed on the map interface when moving the map; and resume displaying the profile photo on the map interface after a preset period of time since an end of the drag action.

5. The terminal according to claim 1, wherein the communication between the terminal and the target terminal includes at least one of a voice information interaction, a text information interaction, a picture information interaction, and a video information interaction.

6. The terminal according to claim 1, wherein the processor is further configured to execute the instructions to:
receive traffic information along the updated travel path;
determine, in response to the change of the current geographic location of the target terminal, an updated travel time between the terminal and the target terminal along the updated travel path based on the traffic information; and
display, on the map interface of the instant communication social networking application, the updated travel time.

7. The terminal according to claim 1, wherein the processor is further configured to execute the instructions to:
display a profile photo of a profile associated with the target terminal at the current geographic location of the target terminal on the map interface.

8. The terminal according to claim 7, wherein the processor is further configured to execute the instructions to:
acquire user information of the profile; and
display, on the instant communication social networking application, the user information of the profile in response to a selection of the profile photo.

9. The terminal according to claim 1, wherein the processor is further configured to execute the instructions to:
obtain a speed of the target terminal; and
determine, in response to the change of the current geographic location of the target terminal, an updated time the target terminal will reach a preset location based on the speed of the target terminal, and
display, on the map interface of the instant communication social networking application, the updated time.

10. The terminal according to claim 6 wherein the processor is further configured to execute the set of instructions to:
display, on the map interface of the instant communication social network application, textual descriptions descriptive of the updated travel path.

11. A method for sharing a geographic location, comprising:
providing a terminal as a first terminal
the first terminal including a processor-readable storage medium and a processor in communication with the storage medium to perform the method, and
the first terminal is in communication with a second terminal an instant communication social networking application installed in the first terminal;
displaying, on a map interface of the instant communication social network application of the first terminal, a first set of highlights indicative of a travel path between a geographic location of the first terminal and a geographic location of the second terminal;
acquiring, by the first terminal, a current geographic location of the first terminal at a first preset interval of time, the current geographic location acquired from a positioning application installed in the terminal;
receiving, by the first terminal, a tracking instruction from an interface of the instant communication social networking application to track the geographic location of the second terminal;
receiving, by the first terminal and in response to the tracking instruction, geographic location information updates of the second terminal, each of the geographic location information updates including an indication of a corresponding updated geographic location of the second terminal;
determining, by the first terminal and in response to each of the geographic location information updates of the second terminal, an update to the travel path between the geographic location of the first terminal and the corresponding updated geographic location of the second terminal; and
refreshing, on the map interface of the instant communication social networking application installed on the first terminal, the first set of highlights to display the update to the travel path.

12. The method according to claim 11, further comprising:
repeatedly acquiring, by the first terminal, the current geographic location information of the first terminal at the first preset interval of time;
repeatedly sending, by the first terminal, the current geographic location information of the first terminal to the second terminal at a second preset interval of time; and
displaying, by the first terminal, the current geographic location of the first terminal on the map interface.

13. The method according to claim 12, further comprising:
displaying, by the first terminal, a profile photo at the current geographic location of the first terminal on the map interface.

14. The method according to claim 13, further comprising:
detecting, by the first terminal, a drag action executed on the map interface;
moving, by the first terminal, a map displayed on the map interface according to the drag action;
hiding, by the first terminal, the profile photo displayed on the map interface when moving the map; and
resuming displaying, by the first terminal, the profile photo on the map interface after a preset period of time since an end of the drag action.

15. The method according to claim 11, wherein the communication between the first terminal and the second terminal includes at least one of a voice information interaction, a text information interaction, a picture information interaction, or a video information interaction.

16. The method according to claim 11, further comprising:
generating updated audio driving directions along the travel path in response to at least one of the geographic location information updates of the second terminal; and
broadcasting the updated audio driving direction through a speaker connected to the first terminal.

17. The method according to claim 16, further comprising:
displaying, by the first terminal in response to each of the geographic location information updates of the second terminal, a profile photo at the corresponding updated geographic location of the second terminal on the map interface.

18. The method according to claim 17, further comprising:
acquiring, by the first terminal, user information associated with the profile photo; and displaying, by the first terminal, the user information when the profile photo is selected.

19. The method according to claim 11, further comprising:
   obtaining, by the first terminal, a speed of the second terminal; and
   determining, by the first terminal based on the speed, a time the second terminal will reach the geographic location of the first terminal.

20. The method according to claim 11, wherein the-travel path is a first travel path, the method further comprising the steps of:
   displaying, on the map interface of the instant communication social network application of the first terminal, a second set of highlights indicative of a second travel path between the geographic location of the second terminal and a geographic location of a preset location;
   determining, by the first terminal in response to each of the geographic information updates of the second terminal, an update to the second travel path between the geographic location of the second terminal and the geographic location of the preset location; and
   refreshing, on the map interface of the instant communication social networking application of the first terminal, the second set of highlights to indicate the update to the second travel path.

* * * * *